US011204964B1

(12) United States Patent
Coope et al.

(10) Patent No.: US 11,204,964 B1
(45) Date of Patent: Dec. 21, 2021

(54) SYSTEMS AND METHODS FOR CONVERSING WITH A USER

(71) Applicant: PolyAI Limited, London (GB)

(72) Inventors: Samuel John Coope, London (GB); Emmanuel Sevrin, London (GB); Kacper Jakub Zylka, London (GB); Benjamin Peter Levin, London (GB)

(73) Assignee: PolyAI Limited, London (GB)

( * ) Notice: Subject to any disclaimer, the term of this patent is extended or adjusted under 35 U.S.C. 154(b) by 0 days.

(21) Appl. No.: 17/137,792

(22) Filed: Dec. 30, 2020

Related U.S. Application Data

(63) Continuation of application No. 17/062,232, filed on Oct. 2, 2020.

(51) Int. Cl.
*G06F 16/90* (2019.01)
*G06F 16/9032* (2019.01)
(Continued)

(52) U.S. Cl.
CPC ...... *G06F 16/90332* (2019.01); *G10L 15/063* (2013.01); *G10L 15/26* (2013.01)

(58) Field of Classification Search
CPC .. G06B 1/25; H04B 1/25; H04M 1/25; H04N 1/25; H04L 1/25; G06N 1/25
See application file for complete search history.

(56) References Cited

U.S. PATENT DOCUMENTS

| 6,144,938 | A | * | 11/2000 | Surace | G10L 13/033 |
| | | | | | 704/257 |
| 6,360,280 | B1 | * | 3/2002 | Jones | G06F 16/168 |
| | | | | | 719/328 |

(Continued)

FOREIGN PATENT DOCUMENTS

| CN | 104350458 A | 2/2015 |
| EP | 0647344 B1 | 1/2001 |
| WO | 03060451 A1 | 7/2003 |

OTHER PUBLICATIONS

Google Cloud; "Speech-to-Text" available as of Jan. 7, 2021 at the website: https://cloud.google.com/speech-to-text; pp. 1-9.
(Continued)

*Primary Examiner* — Neeraj Sharma
(74) *Attorney, Agent, or Firm* — Bracewell LLP; Christopher L. Drymalla

(57) ABSTRACT

A system comprising:
an input configured to receive input speech data originating from a user;
an output configured to output speech or text information; and
a processor configured to:
provide first input data to a character sequence determination module to determine a character sequence from the first input data, wherein determining a character sequence comprises:
obtaining a first list of one or more candidate character sequences from the first input data;
selecting a first candidate character sequence from the first list;
generating a first confirm request to confirm the selected first candidate character sequence, wherein the first confirm request is outputted by way of the output;
if second input data indicating that the first candidate character sequence is not confirmed is received, selecting a second candidate character sequence and generating a second confirm request to confirm the selected second candidate if the second candidate character sequence is different from the first candidate character sequence, wherein the second confirm request is outputted by way of the output; and
if second input data indicating that the first candidate character sequence is confirmed is received, the one or more processors are further configured to:
(Continued)

provide third input data to a dialogue module, wherein the dialogue module is configured to:

determine, based on the third input data, a dialogue act that specifies speech or text information; and output, by way of the output, the speech or text information specified by the determined dialogue act.

17 Claims, 15 Drawing Sheets

(51) Int. Cl.
*G10L 15/26* (2006.01)
*G10L 15/06* (2013.01)

(56) References Cited

U.S. PATENT DOCUMENTS

| | | | |
|---|---|---|---|
| 6,556,970 B1* | 4/2003 | Sasaki | G01C 21/3608 382/100 |
| 6,757,362 B1* | 6/2004 | Cooper | H04M 3/527 379/88.01 |
| 7,296,156 B2 | 11/2007 | Marmigere et al. | |
| 7,769,794 B2* | 8/2010 | Moore | G06F 16/168 707/831 |
| 8,099,288 B2 | 1/2012 | Zhang et al. | |
| 8,151,364 B2 | 4/2012 | Hewitt et al. | |
| 8,401,846 B1 | 3/2013 | Reding et al. | |
| 8,660,849 B2* | 2/2014 | Gruber | H04M 1/72484 704/275 |
| 8,806,596 B2 | 8/2014 | Seidl et al. | |
| 8,964,951 B1 | 2/2015 | Brahm et al. | |
| 9,392,456 B2 | 7/2016 | Disraeli et al. | |
| 9,626,969 B2 | 4/2017 | Zavaliagkos et al. | |
| 9,961,197 B2 | 5/2018 | Kurapati et al. | |
| 9,977,773 B1* | 5/2018 | Birnbaum | G06F 16/95 |
| 10,249,304 B2 | 4/2019 | Jaiswal et al. | |
| 10,672,383 B1 | 6/2020 | Thomson et al. | |
| 2002/0069399 A1* | 6/2002 | Miloushey | G06F 8/36 717/108 |
| 2005/0033582 A1* | 2/2005 | Gadd | G06Q 30/02 704/277 |
| 2005/0055321 A1* | 3/2005 | Fratkina | G06F 16/954 706/45 |
| 2008/0256616 A1 | 10/2008 | Guarraci et al. | |
| 2011/0123008 A1 | 5/2011 | Sarnowski | |
| 2017/0235848 A1* | 8/2017 | Van Dusen | G06F 30/20 705/12 |
| 2018/0330721 A1* | 11/2018 | Thomson | G10L 15/1815 |
| 2020/0097496 A1* | 3/2020 | Alexander | G06F 16/9535 |
| 2020/0152184 A1* | 5/2020 | Steedman Henderson | G06N 3/084 |
| 2020/0280552 A1 | 9/2020 | Alexander et al. | |
| 2021/0029249 A1* | 1/2021 | Erhart | H04L 51/02 |

OTHER PUBLICATIONS

Myers, Jason; "Approaches to Effective Alpha-Nueric Input for your Voice Channel" Plum Voice, available as of Jan. 7, 2021 at the website: https://www.plumvoice.com/resources/blog/effective-alpha-numeric-ivr-input/; pp. 1-8.

Myers, Jason; "Solving the Alpha-Numeric Quandry for IVR" Plum Voice, available as of Jan. 7, 2021 at the website: https://www.plumvoice.com/resources/blog/solving-the-alpha-numeric-quandary-for-ivr/; pp. 1-7.

* cited by examiner

... the IVR can automate the rest of the use case

```
INFORMABLE SLOTS: {
    PRICE RANGE: [
    cheap,
    moderate,
    expensive
    ],
    AREA: [
        centre,
        north,
        west,
        south,
        east
    ],
    FOOD: [
        Afghan, African, Afternoon Tea, Asian, Australian,
        Austrian, Barbeque, Basque, Belgian, Bistro, Brazilian,
        British, Cantonese, Caribbean, Catalan, Chinese,
        Christmas, Corsican, Creative, Crossover, Cuban,
        Danish, Dutch, English, Eritrean, French, Fusion.....
    ],
    NAME: [
        Ali Baba, Anatolia, Ask, Backstreet Bistro,
        Bangkok City, Bedouin, Bloomsbury,
        Caffe Uno, Cambridge Lodge, Charlie Chan,
        Chiquito Restaurant Bar, City Stop Restaurant,
        Clowns Cafe, Cocum, Cote, Curry Garden,
        Curry King, Curry Prince, Curry Queen.....
    ]
]
REQUESTABLE SLOTS: [
    Postcode,
    Address,
    Area,
    Food,
    Phone,
    Price Range,
    Signature,
    Name
]
```

SYSTEMS AND METHODS FOR CONVERSING WITH A USER

FIELD

Embodiments described herein relate to systems and methods for conversing with a user, and systems and methods for determining a character sequence.

BACKGROUND

Conversational systems such as voice-based agents are used in many applications such as voice-based search, recommendation, booking, telephone help systems, customer service, and e-banking amongst others. For example, customer support services and call centres may be automated though voice-based, self-service Interactive Voice Response (IVR) systems.

Many conversational systems, such as IVR systems, include a step of identifying and authenticating or verifying users or use cases, before establishing and granting access to services and private data. The identification and authentication may depend on the extraction of a character sequence from the user. Many such systems additionally or alternatively include a step of capturing one or more character sequences as part of the dialogue, for example a step of recording an address including a post code may be included. Examples of character sequences are: postcodes, phone numbers, reference codes and numbers for flights, bookings, insurance policies, package tracking, utilities and governmental services, amongst others. There is a continuing need to improve the determination of such character sequences from input speech.

BRIEF DESCRIPTION OF FIGURES

FIG. 10 shows an example of a domain ontology for the task of restaurant search and reservation according to an example;

DETAILED DESCRIPTION

Figure 1:
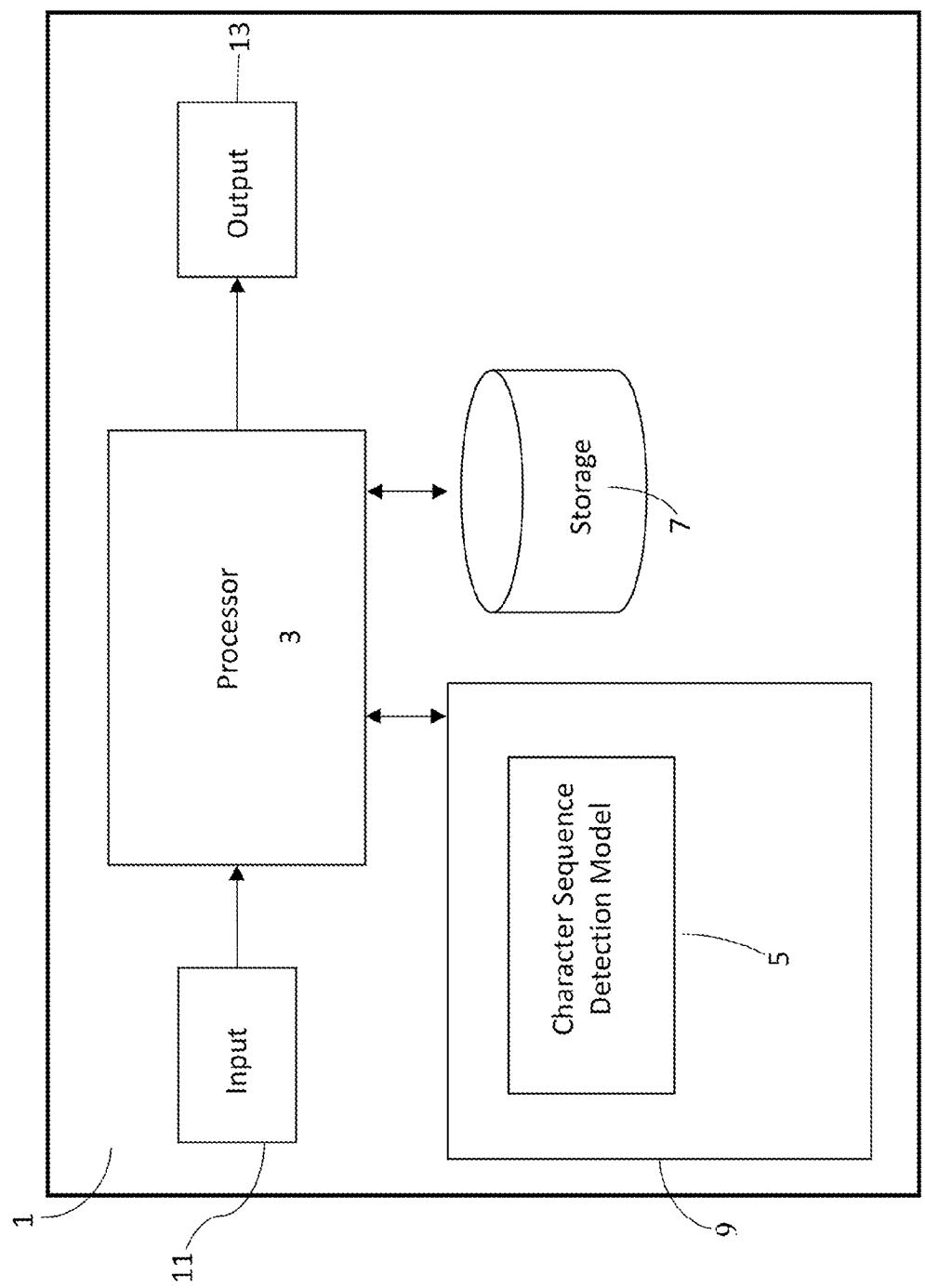
FIG. 1 shows a schematic illustration of a system in accordance with an embodiment.

According to a first aspect, there is provided a system comprising:

an input configured to receive input speech data originating from a user;

an output configured to output speech or text information; and a processor configured to:

provide first input data to a character sequence determination module to determine a character sequence from the first input data, wherein determining a character sequence comprises:

obtaining a first list of one or more candidate character sequences from the first input data;

selecting a first candidate character sequence from the first list;

generating a first confirm request to confirm the selected first candidate character sequence, wherein the first confirm request is outputted by way of the output;

if second input data indicating that the first candidate character sequence is not confirmed is received, selecting a second candidate character sequence and generating a second confirm request to confirm the selected second candidate character sequence if the selected second candidate character sequence is different from the first candidate character sequence, wherein the second confirm request is outputted by way of the output; and if second input data indicating that the first candidate character sequence is confirmed is received, the one or more processors are further configured to:

provide third input data to a dialogue module, wherein the dialogue module is configured to:

determine, based on the third input data, a dialogue act that specifies speech or text information; and output, by way of the output, the speech or text information specified by the determined dialogue act.

The disclosed system addresses a technical problem tied to conversational systems and arising in the realm of Interactive Voice Response (IVR) systems, namely accuracy and efficiency of determination of character sequences from speech. When a first candidate character sequence is not confirmed by the user, a second confirm request to confirm a selected second candidate character sequence is made if the second candidate character sequence is different from the first candidate character sequence. By using the dialogue history, i.e. by selecting a second candidate character sequence which is different to the first candidate character sequence, accuracy of the determination of the character sequence, and efficiency of the system, may be improved.

In an embodiment, the one or more processors are further configured to provide the confirmed character sequence to the dialogue module. In an embodiment, if second input data indicating that the first candidate character sequence is confirmed is received, the one or more processors are further configured to determine if the first candidate character sequence is verified. The third input data may be provided to the dialogue module responsive to determining that the first candidate character sequence is verified. In an embodiment, determining if the first candidate character is verified comprises comparing the first candidate character sequence with a reference character sequence.

In an embodiment, determining a dialogue act comprises:
determining, based on the third input data, a belief state that comprises information corresponding to one or more dialogue options comprising a slot and a corresponding slot value;
determining the dialogue act by inputting information relating to the belief state into a policy model.

In an embodiment, if second input data indicating that the first candidate character sequence is not confirmed is received, the one or more processors are further configured to:
generate a repeat request for the user to repeat the input character sequence, wherein the repeat request is outputted by way of the output;
responsive to receiving fourth input data, obtaining a second list of one or more candidate character sequences from the fourth input data;
selecting the second candidate character sequence from the second list.

In an embodiment, the one or more processors are further configured to:
generate an input request for a character sequence, wherein the input request is outputted by way of the output;
wherein the first input data is received in response to the input request.

In an embodiment, selecting a candidate character sequence comprises:
applying one or more criteria to the candidate character sequences;
if no candidate character sequences in the list meet the one or more criteria, generating a repeat request for the user to repeat the input character sequence, wherein the repeat request is outputted by way of the output.

In an embodiment, selecting a first candidate character sequence from the first list comprises:
comparing one or more entries in the first list with a regular expression;
if an entry in the first list corresponds to the regular expression:
selecting a first candidate character sequence from the first list, wherein the first candidate character sequence corresponds to the regular expression;

In an embodiment, the selected second candidate character sequence corresponds to the regular expression.

According to a second aspect, there is provided a system for detecting a character sequence, the system comprising:
an input configured to receive input speech data originating from a user;
an output configured to output speech or text information;
a processor configured to:
obtain a first list of one or more candidate from first input data received by way of the input;
compare one or more entries in the first list with a regular expression, wherein the regular expression specifies a character sequence format;
if an entry in the first list corresponds to the regular expression:
select a first candidate from the first list, wherein the first candidate corresponds to the regular expression;
generate a first output based on the selected first candidate, wherein the first output is outputted by way of the output.

The disclosed system addresses a technical problem tied to conversational systems and arising in the realm of Interactive Voice Response (IVR) systems, namely accuracy and efficiency of determination of character sequences from speech. A candidate character sequence is selected from a list by using a regular expression. The regular expression specifies a template character sequence, or character sequence format, corresponding to the structure of the character sequence the system is expecting to receive. By using the regular expression, the expected structure of the character sequence can be used to select a character sequence. Accuracy of the determination of the character sequence, and efficiency of the system, may be improved.

In an embodiment, the first output is a first confirm request to confirm the selected first candidate character sequence. In an embodiment, the one or more processors are further configured to:
if second input data indicating that the first candidate is not confirmed is received:
select a second candidate, wherein the second candidate corresponds to the regular expression; and
generate a second confirm request to confirm the selected second candidate, wherein the second confirm request is outputted by way of the output.

In an embodiment, the first list is ordered based on a likelihood of correspondence to the first input data, wherein comparing one or more entries in the first list with the regular expression comprises comparing the entries in order, and wherein selecting the first candidate from the first list comprises selecting the first entry in the order that corresponds to the regular expression.

In an embodiment, if second input data indicating that the first candidate is not confirmed is received, the one or more processors are further configured to:
generate a repeat request for the user to repeat the input, wherein the repeat request is outputted by way of the output;
receive third input data and obtaining a second list of one or more candidates from the third input data;
compare one or more entries in the second list with the regular expression;
if an entry in the second list corresponds to the regular expression:
select the second candidate from the second list, wherein the second candidate corresponds to the regular expression.

In an embodiment, the second candidate is different from the first candidate. In an embodiment, the second candidate comprises selecting an entry from the second list other than the first candidate. In an embodiment, the second list is ordered based on a likelihood of correspondence to the second input data, wherein comparing one or more entries in the second list with the regular expression comprises comparing the entries in order, and wherein selecting the second candidate from the second list comprises selecting the first entry in the order that corresponds to the regular expression and that does not correspond to the first candidate.

In an embodiment, if no entries in the second list other than the first candidate correspond to the regular expression, the one or more processors are further configured to:
determine a modified candidate, wherein determining the modified candidate comprises replacing a character from the second candidate with an alternative character;

generate a third confirm request to confirm the modified candidate, wherein the third confirm request is outputted by way of the output.

In an embodiment, if second input data indicating that the first candidate is confirmed is received, the one or more processors are further configured to:

provide third input data to a dialogue module, wherein the dialogue module is configured to:

determine, based on the third input data, a dialogue act that specifies speech or text information; and output, by way of the output, the speech or text information specified by the determined dialogue act.

According to third aspect, there is provided a method comprising:

receiving, by way of an input, input speech data originating from a user;

outputting, by way of an output, speech or text information; and providing first input data to a character sequence determination module to determine an input character sequence from the first input data, wherein determining a character sequence comprises:

obtaining a first list of one or more candidate character sequences from the first input data;

selecting a first candidate character sequence from the first list;

generating a first confirm request to confirm the selected first candidate character sequence, wherein the first confirm request is outputted by way of the output;

if second input data indicating that the first candidate character sequence is not confirmed is received, selecting a second candidate character sequence and generating a second confirm request to confirm the selected second candidate character sequence if the second candidate character sequence is different from the first candidate character sequence, wherein the second confirm request is outputted by way of the output; and if second input data indicating that the first candidate character sequence is confirmed is received:

providing third input data to a dialogue module, wherein the dialogue module is configured to:

determining, based on the third input data, a dialogue act that specifies speech or text information; and outputting, by way of the output, the speech or text information specified by the determined dialogue act.

According to a fourth aspect, there is provided a method for detecting a character sequence, the method comprising:

receiving, by way of an input, input speech data originating from a user;

outputting, by way of an output, output speech or text information;

obtaining a first list of one or more candidates from first input data received by way of the input;

comparing one or more entries in the first list with a regular expression, wherein the regular expression specifies a character sequence format;

if an entry in the first list corresponds to the regular expression:

selecting a first candidate from the first list, wherein the first candidate corresponds to the regular expression;

generating a first output based on the selected first candidate, wherein the first output is outputted by way of the output.

The methods are computer-implemented methods. Since some methods in accordance with embodiments can be implemented by software, some embodiments encompass computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal. The carrier medium may comprise a non-transitory computer readable storage medium. According to a fifth aspect, there is provided a carrier medium comprising computer readable code configured to cause a computer to perform any of the above described methods.

FIG. 1 shows a schematic illustration of a system 1 in accordance with an embodiment. The system 1 comprises an input 11, a processor 3, a working memory 9, an output 13, and storage 7. The system 1 takes an input speech signal and outputs a speech or text signal. The system 1 may be a mobile device such as a laptop, tablet computer, smartwatch, or mobile phone for example. Alternatively, the system 1 may be a computing system, for example an end-user system that receives inputs from a user (e.g. via a keyboard, screen or microphone) and provides output (e.g. via a screen or speaker), or a server that receives input and provides output over a network.

The processor 3 is coupled to the storage 7 and accesses the working memory 9. The processor 3 may comprise logic circuitry that responds to and processes the instructions in code stored in the working memory 9. In particular, when executed, a character sequence detection model 5 such as described below is represented as a software product stored in the working memory 9. Execution of the character sequence detection model 5 by the processor 3 will cause embodiments as described herein to be implemented. Furthermore, when executed, a dialogue model such as described below is also represented as a software product stored in the working memory 9. Execution of the dialogue model by the processor 3 will cause embodiments as described herein to be implemented.

The processor 3 also accesses the input module 11 and the output module 13. The input and output modules or interfaces 11, 13 may be a single component or may be divided into a separate input interface 11 and a separate output interface 13. The input module 11 receives user input speech data through an input, which may be a receiver for receiving data from an external storage medium or a network or a microphone for example. The output module 13 provides a response generated by the processor 3 to an output such as a speaker or screen, or a transmitter for transmitting data to an external storage medium or a network for example. The input provided is in the form of audio, and the output is provided to the user in the form of text or audio. It should be noted that the system can be configured to work with one or both of text and audio output signals. Working with text interfaces (and not only audio) can allow, for example, hearing impaired people to also use the system.

The system may further comprise means of communication with third-party services. For example, the system may be configured to communicate with a restaurant system when attempting to finalise a restaurant booking process (to check availability for a particular date, time, and number of people for example). The communication means may comprise a connection to a communication network for example.

The storage 7 is communicatively coupled with the processor 3. The storage 7 may contain data that is used by the various models when executed by the processor 3. As illustrated, the storage 7 is local memory that is contained in the device. Alternatively however, the storage 7 may be wholly or partly located remotely, for example, using cloud based memory that can be accessed remotely via a communication network (such as the Internet). The character sequence detection model 5 is stored in the storage 7. The character sequence detection model 5 is placed in working memory 9 when executed. Where included, dialogue model is also stored in the storage 7 and placed in working memory 9 when executed.

Various parts of the system may be located remotely. As described above, the storage 7 may be wholly or partly located remotely. For example, various parts of the system 1 may be located in a common system with hardware such as a microphone, keyboard and/or speaker for inputting and outputting signals. Alternatively, various parts of the system 1 may be located remotely from such hardware, and receive data regarding the input signal transmitted from another unit, and transmit data regarding the output signal to the same or a different unit. For example, the system may be implemented on a cloud computing system, which receives and transmits data. Although in the described system, a single processor 3 is used, the system may comprise two or more remotely located processors configured to perform different parts of the processing and transmit data between them.

Usual procedures for the loading of software into memory and the storage of data in the storage unit 7 apply. The character sequence detection model 5, and where included the dialogue model, can be embedded in original equipment, or can be provided, as a whole or in part, after manufacture. For instance, the models can be introduced, as a whole, as a computer program product, which may be in the form of a download, or can be introduced via a computer program storage medium, such as an optical disk.

Alternatively, modifications to existing dialogue manager software can be made by an update, or plug-in, to provide features of the above described embodiment.

While it will be appreciated that the above embodiments are applicable to any computing system, the example computing system illustrated in FIG. 1 provides means capable of putting an embodiment, as described herein, into effect.

In use, the system 1 receives data corresponding to input speech data through data input 11. The model 5, executed on processor 3, outputs data corresponding to output speech or text information through the output 13 in the manner which will be described with reference to the following figures. It will be understood therefore that the system 1 of FIG. 1 implements a method for detecting a character sequence (as will be described in relation to FIG. 4). The system 1 of FIG. 1 may also implement a dialogue method (as will be described in FIG. 9).

A system such as an IVR system may collect character sequences, comprising alphanumeric inputs for example, in single-turn interactions with a user, using voice. The voice input, i.e. speech, is transcribed into text using an automatic speech recognition (ASR) tool. The input is then extracted using natural language processing or some rule-based mechanisms for example. Speech recognition is a source of error in such systems.

The quality of speech recognition suffers particularly with character sequences due to confusingly similar sounding letters, and dealing with randomness inherent in such sequences. Hand-crafted adjustments such as precompiled dictionaries or grammars generally do not succeed in improving automatic speech recognition for character sequences. The quality of the speech recognition may also be affected by uncontrollable factors such as noise and speech signal quality, and user characteristics such as accent, gender, speech pace, language and/or dialect. Errors originating from noisy speech recognition across single turns can impair the functioning of such systems.

Figure 2:
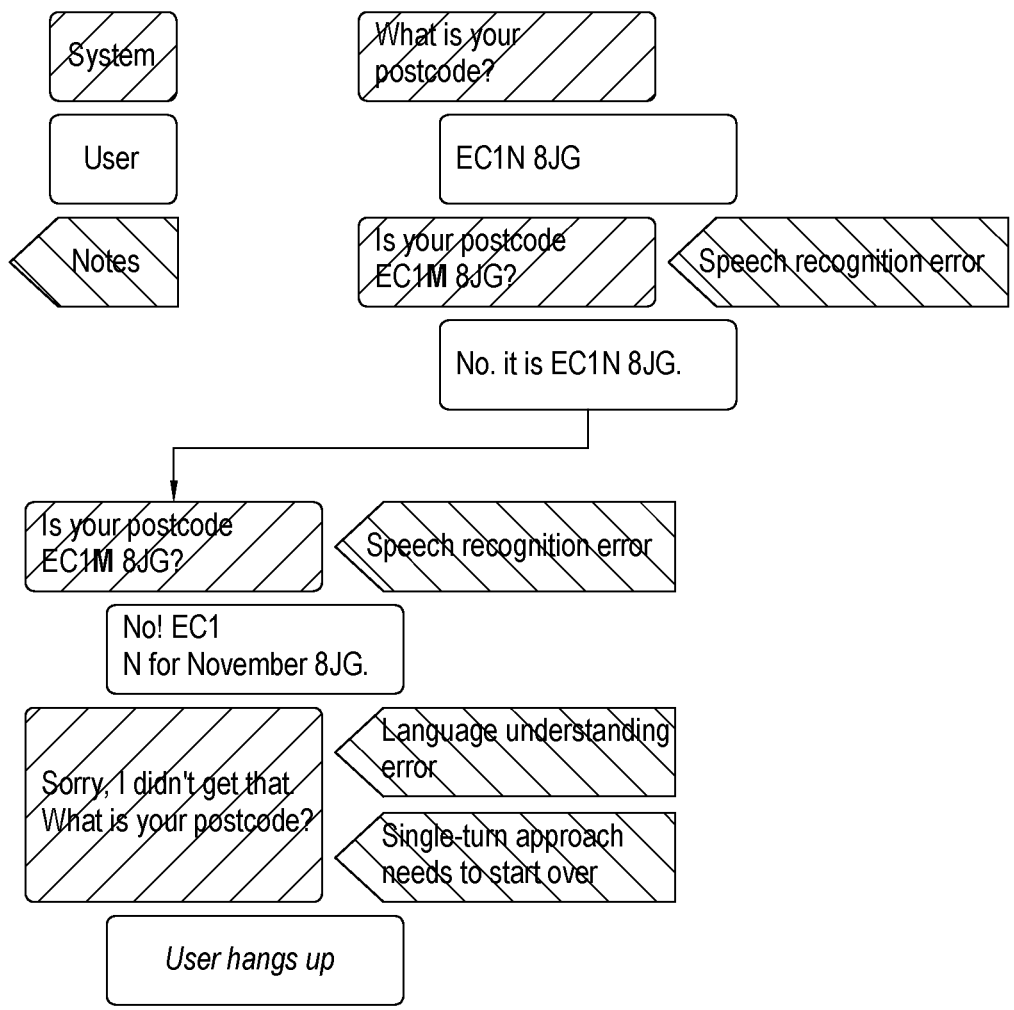
FIG. 2 shows an example of a dialogue performed between a human user and an IVR system according to an example.

FIG. 2 shows an illustration of an example dialogue performed between a human user and an IVR system according to an example, in which an alphanumeric input is collected in single-turn interactions with a user, using voice. In the example of FIG. 2, the system prompts the user for their postcode. The user responds with an answer ("EC1N8JG"). The system transcribes the user's response and outputs the response ("EC1M8JG") to the user to confirm. The user responds with a negative in this case and provides the input ("EC1N8JG") again. The IVR system starts over again, transcribes the user's response and outputs the response ("EC1M8JG"), which in this case is the same as the previously transcribed response, to the user for confirmation. The user then responds negatively and attempts to provide the answer by providing additional information (e.g. "N for November" using NATO phonetic alphabet). The system then responds with an error message and starts over. The user then hangs up.

The system of FIG. 2 uses a plurality of independent single turn interactions. Therefore, as shown in the figure, the system is more likely to repeat erroneous transcriptions (e.g. "EC1M8JG"). In other words, because of the independence of single-turn interactions, recognition errors are more likely to recur on input retries, as nothing is retained from previous single-turn attempts. When recognition errors reoccur on system retries, the user may be frustrated and hang up (as shown in the dialogue in FIG. 2). Alternatively, the system may abandon automatic detection and divert the rest of the call to a human agent (not shown). In this case further automation is prevented.

Alternatively, an IVR system may collect character sequence inputs using dual-tone multi-frequency signalling (DTMF) by the user pressing keys on a telephone keypad, or through SMS for example. Or alternatively, the IVR system may use authentication mechanisms, e.g. based on voice biometrics, to collect inputs. These options may be limited to certain segments of inputs, use cases, and/or devices however. Authentication mechanisms that rely on voice biometrics might also imply additional privacy or security considerations.

Figure 3:
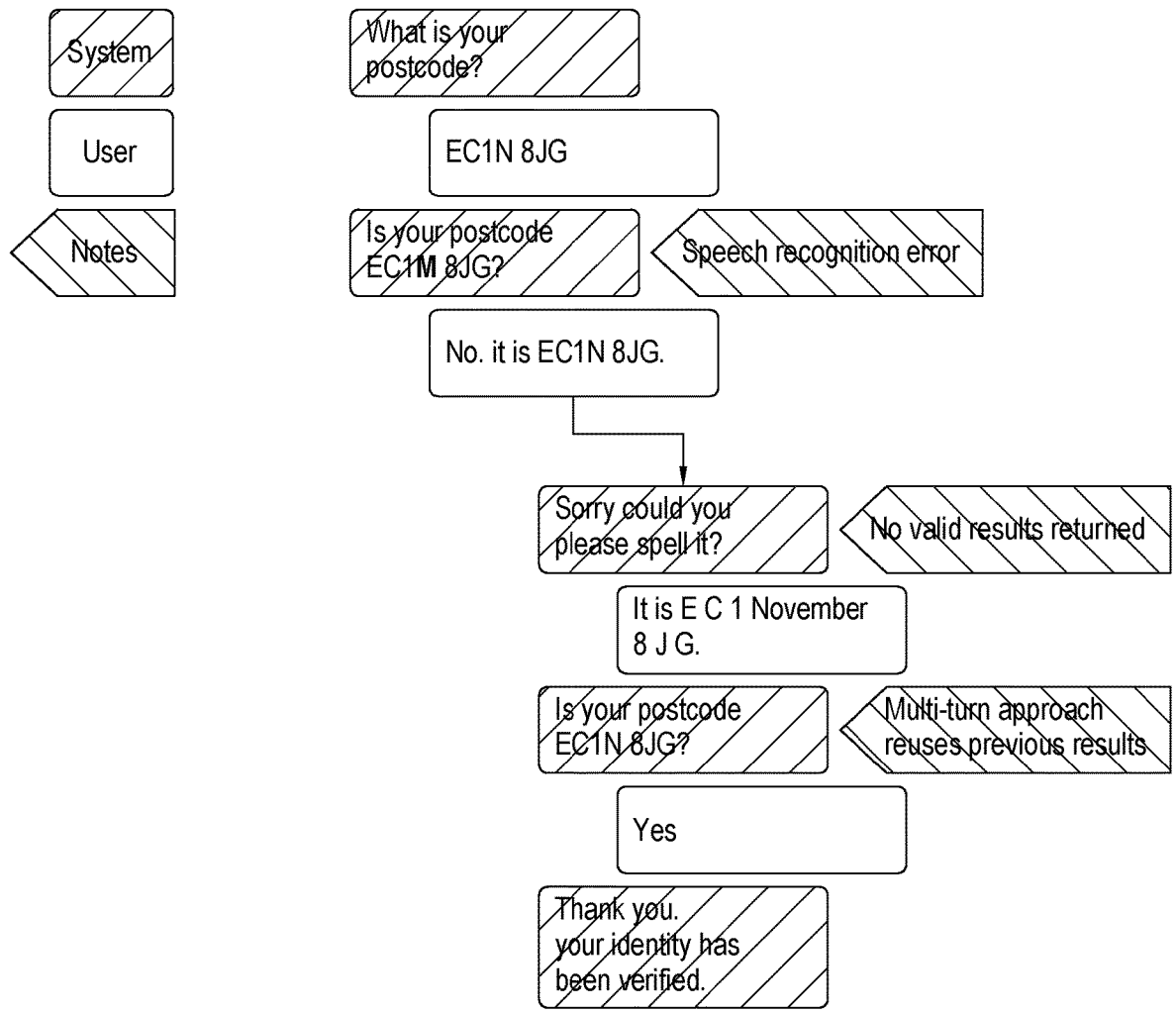
FIG. 3 shows an example of a dialogue performed between a human user and an IVR system according to an embodiment.

FIG. 3 shows an illustration of an example dialogue performed between a human user and an IVR system according to an embodiment. The IVR system detects a character sequence over multiple turns. A multi-turn conversation in which the IVR system keeps track of dialogue history, for example during an authentication and identification conversation, is shown. The IVR system performs multi-turn character sequence extraction through spoken dialogue. This may mitigate errors from noisy speech recognition across single turns for example.

The multi-turn IVR used to generate the dialogue in FIG. 3 detects an inputted character sequence over multiple turns. While many character sequences might be captured already in a first turn, as shown in the per-turn success rates described further below in relation to Table 1, additional turns enable further successful captures. Therefore, the overall success rate may be improved.

In the example of FIG. 3, the system prompts the user for their postcode in the same way as in the example of FIG. 2. After the user has indicated that there was a speech recognition error and provided the same answer ("EC1N8JG") a second time, the system again processes the user's response to extract one or more possible character sequences. In this case, the single extracted character sequence is again "EC1M8JG". As "EC1M8JG" has already been tried in the previous turn, the system recognises "EC1M8JG" is not a valid result. Instead of presenting the same result to the user again, the system prompts the user to spell the code again ("Sorry, could you please spell it?"). The system therefore re-uses the previous result to avoid suggesting the same answer a second time.

The user then responds with "It is E C 1 November 8 J G". The system again processes the user's response to extract one or more possible character sequences, and again reuses the previous results, by eliminating the sequence presented in the previous turn (EC1M8JG) from the possible options, and outputs character sequence ("Is your postcode EC1N8JG") to the user for confirmation. The system receives confirmation from the user ("Yes") and outputs a message to inform the user that the code had been accepted ("Thank you, your identity has been verified").

The multi-turn system of FIG. 3 mitigates errors in noisy speech recognition. As described below in relation to Table 1, capturing the sequence over multiple turns improve the success rate. The multi-turn IVR also yields improved user experience and higher containment rates—by not repeating erroneous results to the user, the user is less likely to hang up. The multi-turn IVR enables IVR automation by reducing the need to divert the call to a human operator, since the multi-turn IVR is more successful at capturing a character sequence from input speech provided by a user.

A character sequence may comprise an alphanumeric input (ANI) sequence for example. While the example of FIG. 3 and other examples in the description focus on determining sequences of alphanumeric input (ANI) characters, which are the most frequent and are a common use case, it will be appreciated that other characters and symbols, including any of: special symbols such as @, #. $, &, . . . ; non-Latin letters; and non-Arabic numerals may additionally or alternatively be determined. In an example, character sequences comprising Latin letters and Arabic numerals are determined. Additionally or alternatively, the determined character sequence may comprise any of: special symbols, non-Latin letters (for example Greek letters), and/or non-Arabic numerals (for example Chinese numerals).

In this specification, the term "character sequence" is used to refer to a text string comprising a plurality of individual characters. By individual characters, it is meant that each character is itself a separate unit in the text string. Thus determining a character sequence comprises determining a plurality of individual characters, as opposed to determining a string of words which each comprise characters. Although the determined character sequence may in some cases form a word (for example, a postcode may start with "ME") the individual characters "M" and "E" are determined separately as part of the character sequence, in other words the individual characters form separate units in the determined sequence. The units of the determined sequence are characters rather than words. The methods and systems described herein are intended to capture random sequences of characters such that the unit of information is at character level, rather than at word level.

The plurality of individual characters corresponds to a structured code. The structured code may also be referred to as a structured character sequence. A structured code may be understood as a sequence of characters that meets certain rules such as code length, and/or whether each character in the sequence is a letter and/or numeral for example. It will be understood that other rules are possible. An example of a structured code is a 4-digit PIN code which is often used with bank cards—in this example, the structured code comprises a sequence of four numbers. Another example of a structured code is a UK postal code—a UK postal code may be a sequence of ANI characters that is seven characters long, where the where the $3^{rd}$ and $5^{th}$ characters are numbers and the remaining characters are letters for example. It will be understood that other structured codes may be used. Note that, in practice, while the above refers to structured codes (or structured character sequences) where there is prior knowledge of the character sequence structure that is expected, the methods and systems described herein are also applicable to random character sequences. Random character sequences here refers to character sequences for which there is no prior knowledge of the character sequence structure that is expected.

The examples shown herein concern character sequences that are 'non-meaningful' words. For example, the character sequence "EC1N8JG" does not have a meaning in the English language. ASR systems often fail on such sequences (since e.g. random sequences of alphanumeric characters are often more difficult to predict from the context, i.e. the rest of the input utterance, than meaningful words). However, the method can be applied to character sequences that are also meaningful words in English and/or other languages. For example, a character sequence corresponding to a structured code might be "POSTED" or "CODENAME".

A character sequence, as described above, is determined by the system. How this is achieved will be described further below. Note, that while the goal of the system is to capture character sequences, the user is free to use words while conversing with the system. For example, as shown in FIG. 3, the user may state "It is E C 1 November 8 J G". Here, the input speech data originating from the user contain words such as "It", "is", and "November" as well as individual characters such as "E", "C", and "8", for example. The system is able to process input speech data, for example, that comprises: words, individual numbers, individual letters, and/or any other utterance from the user (e.g. filler words such as "um"). By being able to take such a range of speech data as input, the system is more versatile. However, although the system is able to process words, the system is configured to determine a character sequence based on the inputted speech data (including the words), as will be described further below.

Figure 4:
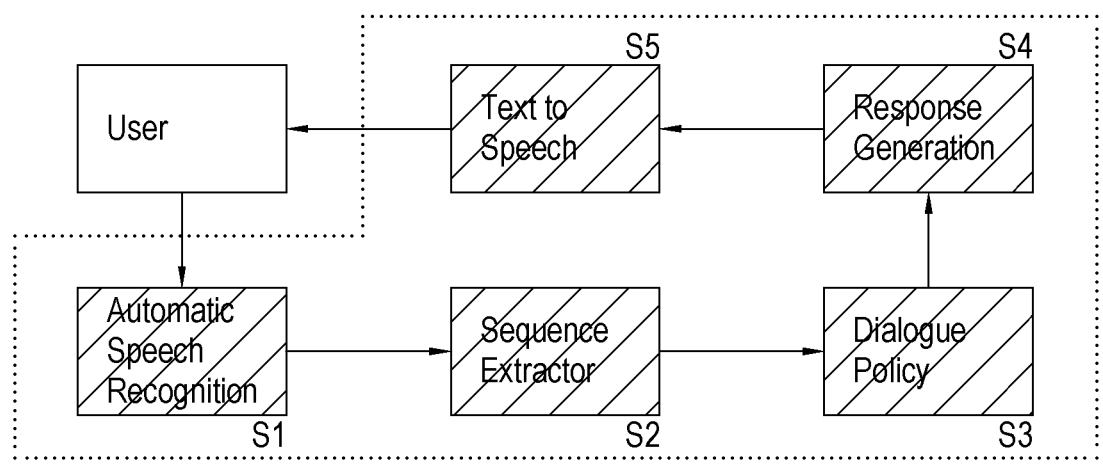
FIG. 4 shows a schematic illustration of a method for determining a character sequence according to an embodiment.

FIG. 4 is a schematic illustration of a method for determining a character sequence according to an embodiment. The method comprises a series of stages or modules. The method may generate the "system" parts of the dialogue shown in FIG. 3. The model 5, when executed on processor 3, may implement the method for determining a character sequence shown FIG. 4.

The method may be used for capturing a character sequence. By this it is meant that an input from a user is not known and is required. An example is obtaining of a credit card number from the user for booking a restaurant. In a capture scenario, the system does not have the character sequence, and the user must provide it and confirm it (e.g., the user must input her address into some application form, or she must provide her phone number).

The method may additionally or alternatively be used for verification. By this it is meant that a reference sequence is known and stored in a database, and the method is used to extract a sequence from the user in order to verify that the extracted sequence matches the stored reference sequence. An example is the obtaining of personal information such as date of birth or a PIN code in order to authenticate a user. In the verification scenario, the system has the character sequence stored. The character sequence determination module then just compares the answer to the one stored in the database before letting the user access additional services after the verification step. Multi-turn conversations that keep track of dialogue history during the authentication and identification conversation mitigate errors.

The method comprises the following modules: ASR S1, sequence extractor S2, dialogue policy S3, response generation S4, and text to speech S5.

The ASR module S1 generates an N-best list of candidate text signals from the audio input. Any suitable type of speech recognition process may be used in the speech recognition step. For example, a trained speech recognition algorithm based on a neural network or Hidden Markov Model may be used. The ASR module may be an 'off-the-shelf' pre-trained ASR system. The training data used to train the system may include single characters. The training data may include sequences of characters. However the training data does not necessarily need to include examples of the types of character sequences to be determined, and may simply be a general ASR training data set.

Various ASR models may assign posterior probabilities to candidate text signals given the input acoustic signal. The ASR output may take the form of an N-best list, which approximates the full posterior distributions over the ASR hypotheses by returning the top N most probable hypotheses with their respective probabilities. An N-best list contains N ranked hypotheses, each hypotheses being a candidate text signal, in order of the respective probabilities, where the first entry is the ASR's best hypothesis (highest probability). The value of N is pre-defined, and is a positive integer. For example, N may be selected as 1, 3, 10 or 20. For example N=20. Using a value of N>1 means that the system is more likely to guess the correct sequence on a subsequent turn even if the user says the input in the same way, since the N best list will still contain a different candidate to that guessed in the previous turn.

Each time the user provides an input, the ASR module returns N candidate text signals. The ASR stage S1 returns an N-best list of ASR hypotheses, each hypotheses being a text signal. The N-best list may correspond to a first list of one or more candidate character sequences.

Optionally, out of the N candidate text signals initially returned, the ASR module may return only some of the candidates; in other words, the N-best list of ASR hypotheses may comprise N items or less. For example, only those candidates from the N candidate text signals that have a probability above a predetermined threshold are returned.

Alternatively, the most probable candidates are selected until the probabilities of the selected candidates add to a value above a predetermined threshold. For example, the top candidates adding to a probability greater than 99.9% are selected. In other words, for a particular turn, if the probabilities of the first 8 candidates add to less than 99.9% and the probabilities of the first 9 candidates add to greater than 99.9%, then the first 9 candidates are selected. If the probabilities of the first 20 candidates add to less than 99.9%, then 20 candidates are selected, since N=20 is the maximum number to be selected. Note that N is a hyper-parameter and its value remains unchanged throughout the conversation. However, the number of candidates out of the N candidate text signals may vary across turn based on the probabilities associates with the text signals. The threshold is also a hyper-parameter which is unchanged throughout the conversation.

Alternatively, additional processing may be performed on the N-best list output from the ASR module S1 in order to generate a first list of one or more candidate character sequences. For example, one or more text signals in the N-best list output directly from the ASR module S1 may comprise a text signal where the user has used a word to denote a character (for example "C for Charlie") or where a character has been erroneously detected as a word by the ASR module S1 ("ate" instead of "8"). An initial step of post-processing the N-best list output from the ASR module S1 to generate the first list of one or more candidate character sequences may be performed as part of the sequence extractor stage S2. This will be described in further detail below, in relation to the transcript post-processing step S2001 in FIG. 5.

The sequence extractor S2 is configured to extract a candidate character sequence from the text signals generated by the ASR S1. The sequence extractor S2 is described further below in relation to FIG. 5 and FIG. 6.

The candidate character sequence selected by the sequence extractor S2 is taken as input to the dialogue policy module S3. The dialogue policy module S3 is rule based. The dialogue policy module S3 takes as input the sequence extracted by sequence extractor module S2, and applies a set of rules to determine a dialogue state. The dialogue policy module S3 is described further below in relation to FIG. 7.

The response generation module S4 then retrieves a predefined template of text associated with the current dialogue state output from the policy module. The predefined template corresponds to text to be output to the user.

In this example, the text response generated in S4 is then converted to speech in the text to speech stage S5. However, as has been described previously, alternatively a text output may be directly output. In S5, text to speech generation is performed to generate a speech signal, which is then output to the user as an audio signal. Any type of text to speech generation process may be used in this step.

Figure 5:
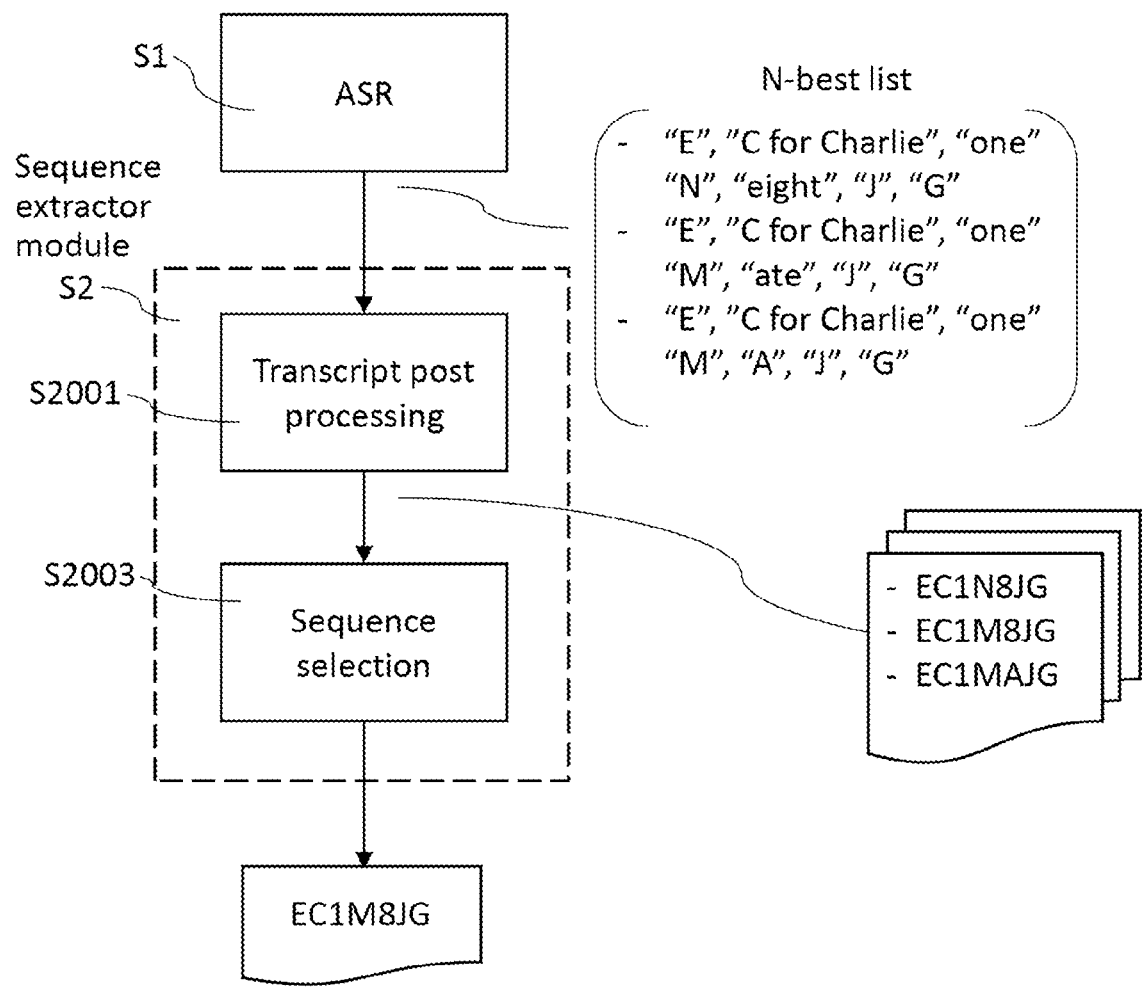
FIG. 5 shows a schematic illustration of a method of obtaining a text signal and extracting a sequence from the text signal in a method according to an embodiment.

FIG. 5 is a schematic illustration of an ASR stage S1 and a sequence extractor stage S2 that are performed as part of a method for determining a character sequence according to an embodiment.

As described above, the ASR S1 returns the top N most probable hypotheses with their respective probabilities. The N most probable hypotheses returned by the ASR is also referred to as an N-best list. The N most probable hypotheses are ordered according to their respective probabilities. For example, the N most probable hypotheses may be ordered in descending order of probability, starting with the hypothesis with the highest probability. As explained above, less than N hypotheses may be returned in some cases.

In the example shown in FIG. 5, a user states the following: "E, C for Charlie, one, N, eight, J, G". The ASR S1 generates an N-best list of the probable text signals of: {E, "C for Charlie", "one" "N", "eight", "J", "G"}; {E, "C for Charlie", "one" "M", "ate", "J", "G"}; {E, "C for Charlie", "one" "M", "A", "J", "G"}; etc. . . . It will be understood that in the N-best list, N may be any positive integer such as {1, 2, 3, 4 . . . and so on}. In the example of FIG. 5, N is equal to 3. The output returned by the ASR S1 is then passed to sequence extractor S2 that performs a sequence selection step S2003 to obtain a selected candidate character sequence in each turn (how this is achieved will be described below). The selected candidate character sequence is stored. In other words, the selected candidate character sequences obtained in each turn are stored across dialogue turns.

The ASR S1 module may comprise two or more different ASR models. In this case, ASR S1 is configured to ensemble the two or more models to improve the accuracy of the predictions. For example, for each of the ASR models, the ASR S1 returns an N-best list. The best candidate sequences (based on their probabilities) from each of the two or more lists may then be combined in order to obtain a single N-best list. This may also be referred to as model ensembling. The single N-best list is directed to the sequence extractor S2. Additionally and optionally, the two different ASR models may be configured for different applications and/or may have been trained using different data sets. For example, a first model may be trained on audio from video clips, or from audio that comprises multiple speakers. This model may be adapted to a wide spectrum of accents and pitches. A second model may have been trained on shorter audio clips from voice commands or voice searches and may cover character sequences and spellings in the training data. For applications in the English language, the first model may be trained on samples comprising US English speech, while the second model may be trained on samples comprising both US English and UK English speech. It has been found that a system comprising an ASR with the combination of the first and second model as above performs well.

Optionally, 'boosting' may be applied in the ASR S1 to one or more characters, for example all letters and numbers, to increase the likelihood that these characters are recognised correctly and help improve the accuracy for character sequences, which are the expected input (rather than words). In an example, boosting involves assigning weights to each possible word and character which may be returned by the ASR module S1, and assigning higher weights to the characters than to the words. A weighted value is assigned to each possible object (i.e. characters and words) that may be returned by the ASR module S1. The probabilities determined by the ASR module S1 are then multiplied by these weights, such that the final output probabilities from the ASR module are the weighted probabilities. In another example, boosting involves adapting the ASR model itself, for example modifying a probability distribution used by the model such that individual characters or numbers more likely to be returned. Automatic speech recognition (ASR) which is boosted towards particular character sequence collection (e.g., alphanumeric input), targeting UK and US English varieties may be used.

The output returned by the ASR module S1 is input to the sequence extractor module S2. The sequence extractor module S2 performs the steps of transcript post processing in S2001 and sequence selection in S2003.

The transcript post-processing step S2001 processes each hypothesis returned by the ASR module S1 to increase the likelihood of obtaining valid codes in subsequent steps. The transcript post-processing step S2001 is an optional step, and may be omitted in some systems. The transcript post-processing step S2001 comprises applying a set of one or more rules to the output of the ASR module S1, i.e. the N-best list. A series of post-processing steps are applied to the N-best list, in the form of a series of rules applied in turn, to increase the likelihood of getting valid codes. Some examples of these rules are listed below. One or more of these rules may be included in the post-processing step S2001. The one or more rules may be applied in any order.

Normalising into a common format by substituting one or more specific words with corresponding characters. For example, normalising comprises substituting specific words for numbers with the character for the numbers. The transcript post-processing S2001 comprises a step of searching the text for any instances of any of a pre-defined set of words (e.g. "one", "two", "three", . . . "ten") and substituting any of these words that are found with the corresponding character ("1", "2", "3", . . . "10"). The step of searching the text may be implemented using a regular expression, for example. The pre-defined set of words and the corresponding characters are stored as part of the model.

Correcting common ASR errors back to letters or words. This may be implemented in the same way, by including in the pre-defined set of words various words that are commonly confused with characters (e.g. "for", "hitch", "why" . . . ) and substituting these words with the corresponding character ("4", "H", Substituting expressions denoting double characters or triple characters by their individual characters. For example, the transcript post-processing S2001 comprises applying a regular expression used to search the text for instances of the term "double" or "triple", and substituting any instances of the word "double" or "triple" with a repeat of the following characters (so "double E" is substituted "E E").

Filtering filler words that commonly occur in ASR. For example, words such as "um" or "then" may appear between vocalised spellings. For example, an ASR hypothesis may comprise the phrase "one", "two", "then", "three", "um", "five". The transcript post-processing S2001 may comprise a step of searching the text for any instances of a pre-defined second set of words (e.g. "um", "then", . . . ) and removing these words. In this case, "um" is removed, resulting in a sequence of "1", "2", "3", "5". Note that filtering filler words can be performed here in transcript processing step S2001, and additionally or alternatively, in the sequence extraction step S2003.

Processing letter-for-word spelling. The transcript post-processing S2001 may comprise applying regular expression to search the text for instances where a letter is followed by the word "for" and then a further word. The word "for" and the further word are then removed. This results in replacing terms such as "H for Heaven" by "H" and "S for snake" by "5".

Processing NATO spelling. NATO spelling is also referred to as the NATO phonetic alphabet, where codewords are assigned to letters of the English alphabet. For example, "A" is referred to by codeword "Alpha", "B" by "Bravo", "C" by "Charlie" etc. . . . . . For example, when a user provides a character such as "A", he or she may say "Alpha" instead of "A". The ASR S1 may then output "Alpha" as part of the hypothesis. In S2001, "Alpha" is substituted by "A". The transcript post-processing S2001 may comprise a step of searching the text for any instances of a pre-defined third set of words, the third set comprising each codeword in the NATO alphabet, and substituting any of these words that are found with the corresponding letter.

The post processed text signals returned by the transcript post processing in S2001 are then inputted to the sequence selection in S2003. The transcript post processing in S2001 generates a first list of one or more candidate character sequences. The candidates returned by the transcript post processing in S2001 are character sequences that correspond to the hypotheses output by the ASR S1. Each post processed character sequence is also referred to as a candidate character sequence or candidate.

In FIG. 5, when the ASR S1 generates a list of the probable text signals such as: {"E C for Charlie one N eight J G"}; {"E C for Charlie one M ate J G"}; {"E C for Charlie one M A J G"}, a list of candidate character sequences comprising "EC1N8JG"; "EC1M8JG" and "EC1MAJG" is obtained after S2001. The list of candidate character sequences is ordered according to the same order as the N-Best list provided by the ASR S1. A step of transcript post-processing S20001 is included to correct common ASR errors and normalise spellings into a common format. This step provides a list of ASR candidates that have been post-processed.

In S2003, sequence selection is performed to select, from the list of candidate character sequences, which candidate (if any) is to be taken as the spelt code. The sequence selection step S2003 is also referred to as ANI code selection in this example. The spelt code is also referred to as the selected candidate character sequence, suggested code or guess.

The spelt code is expected to match a particular pattern. For example, if the expected spelt code is a 4 character long code, then the sequence selection S2003 selects a candidate character sequence which is a 4 character long code.

In S2003, a pre-defined regular expression (regex), the first regular expression, is used to select a character sequence from the list of candidates. The first regular expression is pre-defined based on the intended use of the character sequence detection model. For example, if the character sequence detection model is intended to be used to capture a 4 letter security code, the regular expression corresponds to the expected format or structure of the code, i.e. 4 letters. A pre-defined first regular expression which captures valid codes is used in this step. The first regular expression specifies a character sequence format. This mitigates the impact of speech recognition errors, particularly in noisy conditions.

A regular expression is a sequence of regular characters and/or metacharacters that specify a search pattern. For example, in the regex [a][a-z], [a] is a regular character which matches only 'a', whereas [a-z] is a metacharacter corresponding to the character set 'a, b, c, x, y, z', at least one of which must be a match. Therefore, this regex matches, for example, 'ab', or 'ag', or 'am', but not 'bg' or 'a7'. Such patterns are used for search operations on text strings. The regular expression may be understood as a sequence of characters and/or metacharacters that specify a pattern to match. The first regex specifies a character sequence pattern or structure.

By using a regex, pattern matching may be used to search for a character sequence that corresponds to an expected pattern rather than constructing multiple, literal search queries. For example, in the Python programming language, a regular expression search is typically written as re.search ('regex', ' text_string'). The re.search ( ) function takes the regular expression pattern 'regex' and a string 'text_string' and searches for that pattern within the string. For example, when a 4 letter code is being sought, a suitable regex would be "[A-Za-z] [A-Za-z] [A-Za-z] [A-Za-z]". Here, "[A-Za-z]" means any uppercase characters from "A" to "Z" or any lower case characters from "a" to "z". Another example is for obtaining a UK postcode where the $3^{rd}$ and $5^{th}$ characters are normally a number. In this case, the regex may be: "[A-Za-z] [A-Za-z] [0-9][A-Za-z0-9] [0-9] [A-Za-z] [A-Za-z]".

The sequence selection step S2003 may be understood as a filter that filters out character sequences that do not adhere to the format or template defined by the regex. This mitigates the impact of speech recognition errors, particularly in noisy conditions. Using the regular expression to extract only valid alphanumeric inputs means that the extraction is robust to noisy speech recognition.

The list of candidates is considered in order according to their probabilities (as obtained from the ASR S1) and, starting from the candidate with the highest probability, the first candidate that matches the regex is selected as the spelt code.

Comparing entries in the first list with a regular expression may comprise several stages. An example procedure is described below.

The regular expression, for example "[A-Za-z] [A-Za-z] [A-Za-z] [A-Za-z]", may first be applied to try and find the pattern in the entire text. The term entire text here refers to one item in the N-best list after the N-best list has been processed in the transcript post-processing stage. Given a list of hypotheses in the N-best list, the regular expression may be applied to each of the items in turn. For example, the first regular expression may be applied first to the first item in the list output from the transcript post-processing stage. In this stage, it is determined if the whole text of the first item in the list matches the first regular expression.

In a second stage, if no match is found in the entire text, then filler words which are surrounded by alphanumeric characters are removed from the entire text. Filler words are obtained from a predefined set. Filler words in the entire text may be identified by searching the entire text for each of the predefined filler words in turn, using a different, second, regular expression, and then removing the matched words from the entire text. The removal of filler words in this stage may be performed in a similar manner to the filtering of filler words described above in relation to S2001.

In a third stage, the first regular expression is then applied again to the text after removal of filler words in the second stage. The text after removal of filler words is searched to find a match somewhere in the text, i.e. a character sequence that fits the first regular expression, where other characters may be permitted before or after the sequence. The second and third stages are optional. For example, the comparing entries in the first list may comprise the first stage only.

If no match is again found, the next item in the list is then processed in the same manner (i.e. each of the three stages may be applied to the second item in the list).

Optionally, only a candidate that has not been selected previously is selected. The sequence extractor module S2 maintains a history of unsuccessful attempts from previous turns. The history may be maintained by storing each suggested character sequence. The sequence extractor module S2 uses the history of previous selected candidates when selecting the valid candidate sequence, so that a candidate sequence that has previously been suggested to the user is not selected. For example, when a candidate sequence is determined to match the first regex, a subsequent step of determining if the candidate sequence matches a sequence in the stored history of previous selected candidates is performed. A candidate sequence is only selected if there is a candidate sequence that does not match a sequence in the stored history of previous selected candidates. If a candidate sequence does match a sequence in the stored history of previous selected candidates, then the first regex is applied to the remaining candidates in the list. If no new sequences are found, then the system may ask the user to spell the code, or pass to a human operator, as will be described below.

In this case, a situation can arise where the sequence extractor S2 guesses the correct code, and the user subsequently denies the confirmation by accident. This can mean the user can block themselves out of the system (since the system will not suggest the correct code that has been denied back to the user). However, such accidental behaviour is rare. This can also be avoided by adapting the system to respond to words such as "RESTART" "RESET" or "START OVER" by starting the character sequence extraction from the beginning again, i.e. to return to the greeting dialogue state S1801 described below, and to re-set the history of previous selected candidates and the number of turns to zero. The system can be adapted to respond to "RESTART" "RESET" or "START OVER" in several ways. For example, a rule may be added to the dialogue policy module S3 (described further below) to trigger a reset when these words are transcribed by the ASR S1. Note that other rules may be added to trigger different actions when other words are transcribed by the ASR S1. In another example, a classifier is trained to trigger a reset when a reset word is uttered by the user. The example using a classifier may be versatile and may be trained to trigger on a wide range of words or messages. Either option may be integrated into the policy module S3. For instance, in the second example where a classifier is used, the policy module S3 classifies each user utterance (a binary classification with labels RESET_TRIGGERRED=True or False), and reacts only when RESET_TRIGGERED=True. The classifier can encode the user text (e.g., using standard text encoders such as BERT, USE, etc.) and then run the binary classification—the classification is trained beforehand on a small set of labelled examples with different variations of the RESET/RESTART command.

One or more additional criteria can also be applied to selection of the candidate sequence from the N-best list. For example, in a verification scenario, an additional trimming or biasing of the possible search space of candidates towards ones stored in the database may be applied. The regex may be adapted to define a narrow search in the use case. For example, the regex may be adapted by biasing the search space to correspond to a code with a high likelihood of occurrence. For example, if a user is inputting a UK postcode and, based on other address information already provided, it is known that the first three characters of the postcode are likely to be "E", "C" and "1" the regex might be biased so that the search space is more focused on the stored reference code. For example, a suitable regex might be: "[E] [C] [1] [A-Za-z0-9] [0-9] [A-Za-z] [A-Za-z]". Optionally, the same first regex is kept for all turns of the conversation.

Figure 6:
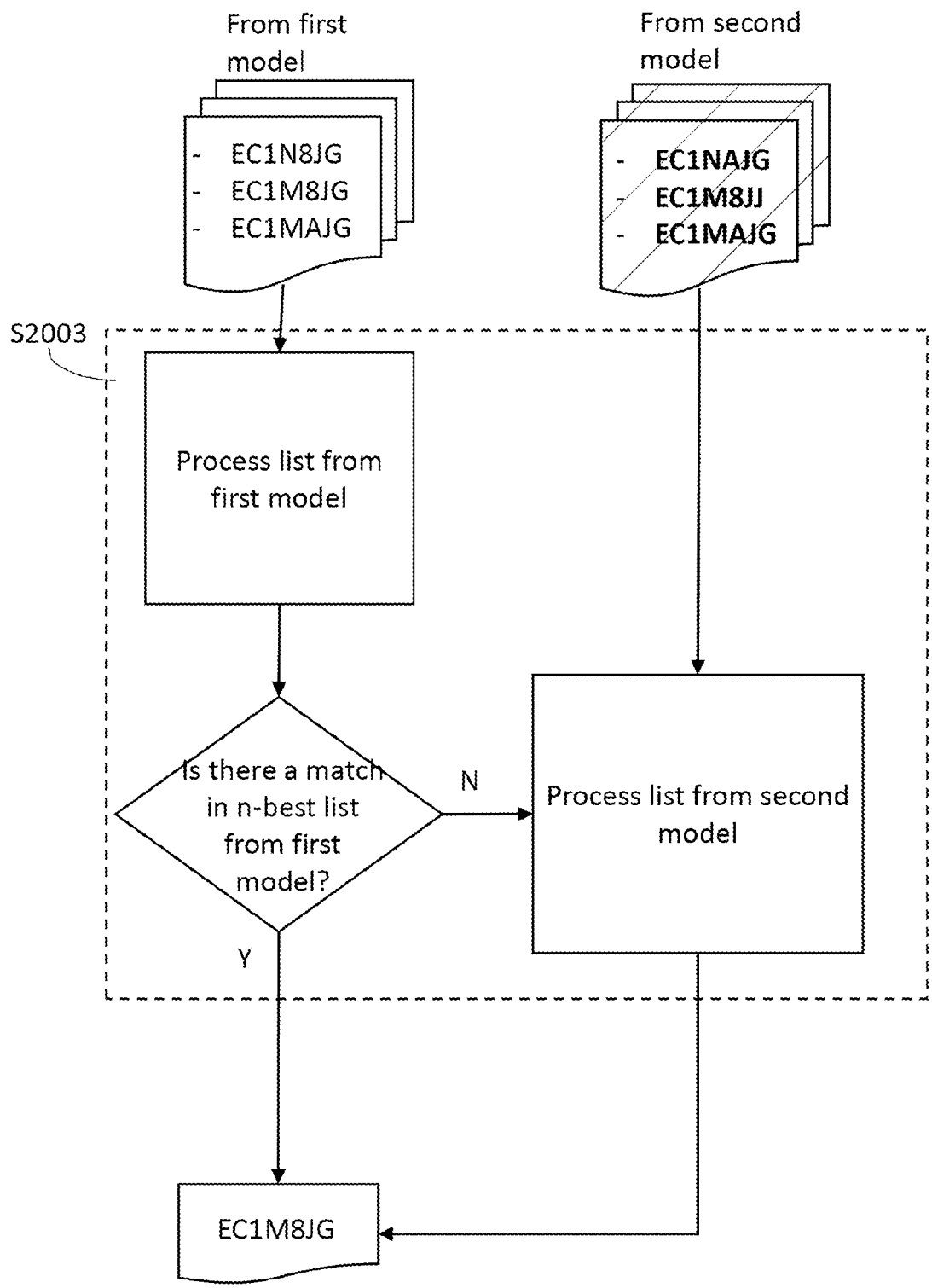
FIG. 6 shows a schematic illustration of method of extracting a sequence from a text signal in a method according to another embodiment.

FIG. 6 shows an alternative method of selecting a candidate character sequence from a first list of candidate character sequences, performed as part of a method according to an embodiment. The ANI code selection step S2003 is similar to that described above in relation to FIG. 5, except that the code selection step S2003 is provided with two lists of candidate sequences. Two lists of candidate sequences may be obtained when the ASR S1 comprises two or more ASR models. In this case, the transcript post-processing step S2001 is applied to each list of hypotheses returned by the ASR S1 to provide a post-processed list from the first model, and a post-processed list from the second model. Returning to S2003 of FIG. 6, the candidate sequences from the first model are searched in the same manner described above and if a match is found, then the matching sequence is selected. If a match is not found, the candidate sequences from the second model are searched and, if a match is found, the matching sequence is selected. The list from the first model is thus processed first, to determine if any valid candidate (that was not already tried) is included. If not, the sequence selection then looks at the results from the second ASR model, to see if any valid candidate is available there. It returns the first valid sequence that it finds.

Figure 7:
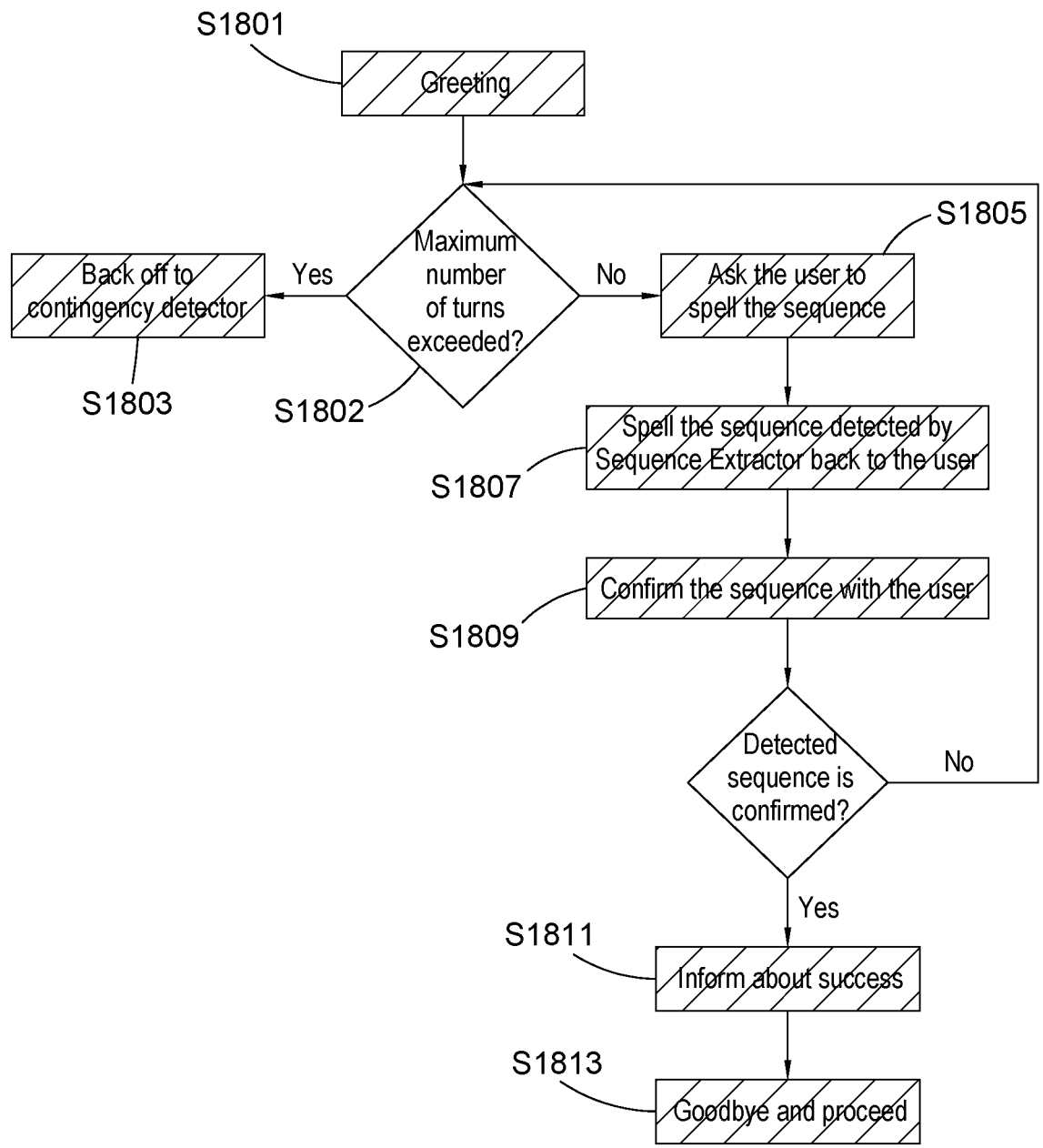
FIG. 7 shows a schematic illustration of a method in accordance with an embodiment.

The dialogue policy module S3 will be described next. FIG. 7 shows an illustration of the method performed at the dialogue policy S3 stage in a method in accordance with an embodiment. The dialogue policy module S3 is rule based and tailored to the use case of character sequence collection. The dialogue policy module S3 relies on the post processed N-best lists obtained after S2001, and the sequence selection step S2003 to obtain a character sequence, in combination with several rules to control the behaviour of the system, i.e. the system output, based on the user's responses.

Figure 8:
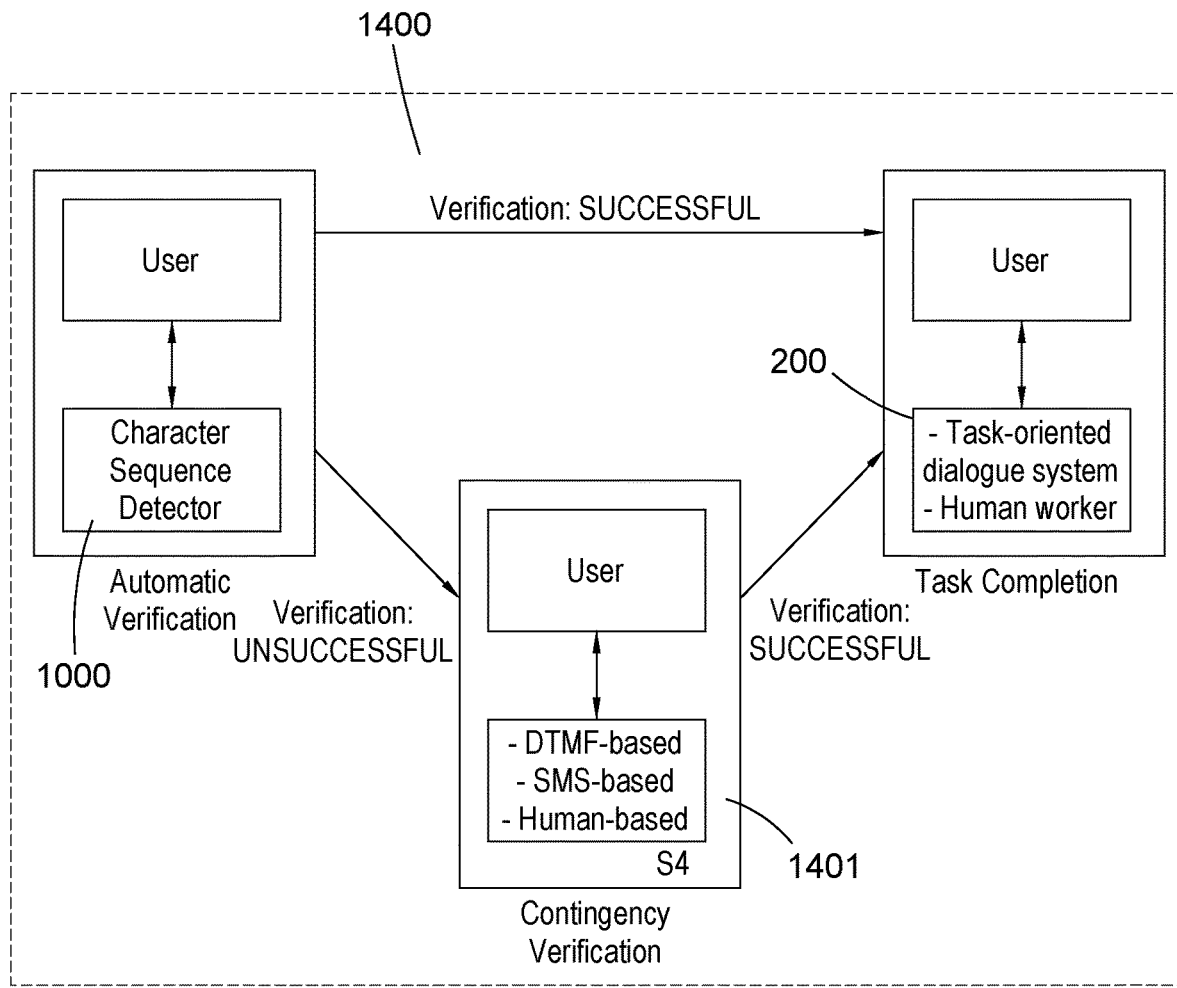
FIG. 8 shows a schematic illustration of a system comprising a character sequence detection module and a dialogue module in accordance with an embodiment.

The dialogue policy S3 comprises a series of rules, the actions of which are summarised as follows:
Ask for character sequence (e.g., a booking number or reference code).
Read out loud what the sequence extractor S2 suggests, and ask for the user to confirm whether it is the correct answer.
If the suggestion from the extractor S2 (the spelt code) is not confirmed as correct, then repeat the request for the character sequence to the user.
If a maximum number of dialogue turns is exceeded, hand off to another mode of identification or capture, or to the human worker (see FIG. 8, in particular the contingency module 1401), then proceed to the next dialogue phase if the final verification or capture is successful (FIG. 8).
If the user confirms that the code suggested by the sequence extractor S2 is correct (within the maximum number of turns), the verification or capture has been successful, and the user can proceed (see FIG. 8).

The dialogue policy module S3 is rule based. The dialogue policy module S3 takes as input the sequence extracted by sequence extractor module S2, and applies a set of rules to determine a dialogue state. Each square box in FIG. 7 corresponds to a dialogue state that that also triggers a corresponding dialogue act. The diamond boxes in FIG. 7 ("max turns exceeded" and "detected sequence is confirmed") correspond to rules. The dialogue policy module S3 keeps track of the state for the previous turn, and moves onto the next state once the user input is received, in accordance with the included rules.

The interaction with the user starts with a greeting (S1801). In the "greeting" dialogue state, the corresponding dialogue act of greeting the user is performed.

A rule is then applied to determine if the maximum number of turns has been exceeded (S1802). The dialogue policy stores the current dialogue turn number. This is an index that increases by one each iteration. If the maximum number of turns has been exceeded, the system returns the dialogue state "back off to a contingency detector" in S1803. Step S1803 triggers a hand over, for example to the contingency verification 1401 of FIG. 8. A fall-back to contingent input mechanisms (e.g. DTMF, SMS), or in the extreme scenario human workers, is provided.

Optionally, the maximum number of dialogue turns is three. It will be understood that other values may be used. The policy S3 can also be adapted to forewarn the user about the maximum number of tries (for example when asking the user for the sequence initially), and/or to warn the user before their last try (based on the predefined maximum number of iterations). This may be implemented by including a further rule prior to S1802, which determines if the maximum number of turns minus one has been exceeded, and moves to a dialogue state "Last try" in this case.

If the maximum number of turns has not been exceeded, the system returns the dialogue state "ask the user to spell the sequence" S1805. As will be described in more detail below, this output is passed to the response generation module S4, and a system response is output to the user which asks the user to spell the relevant sequence to be captured.

The input data (the first input data) received by the system from the user in response to this output is directed to the sequence extractor module S2, which returns a selected candidate sequence as has been described above. This is the first candidate.

The dialogue policy S3 then returns the dialogue state "Spell the sequence detected by Sequence Extractor back to the user" in S1807. This output is passed to the response generator, in which the first candidate sequence selected by the sequence extractor module S2 is spelt back to the user. The spelling back is performed by the response generation S4 and the TTS S5.

The dialogue policy S3 then returns the dialogue state "Confirm the sequence with the user" in S1809. This output is passed to the response generator, and a first confirm request is output relating to the spelled sequence.

A second input data is received by the system from the user. For example, the system is configured to detect a Yes/No response (and variations such as "Yeah", "Nope", "Yes, that's correct"). The user input may be transcribed from the ASR module S1, however, all post processing S2001 and sequence selection S2003 steps are disabled. Thus when the confirm act is issued by the system, all post processing S2001 and sequence selection S2003 steps are disabled, and one or more simple rules are applied, for example a regular expression searching for the terms "Yes", "No" and variants. Alternatively, a separate classifier configured to detect a simple Yes/No response is used instead of the ASR module S1. The classifier can encode the user text (e.g., using standard text encoders such as BERT, USE, etc.) and then run the binary classification—the classification is trained beforehand on a small set of labelled examples with different variations of the Yes/No response.

A rule is then applied at the policy module, to determine if the detected sequence is confirmed from the second input data. If the second input data indicates that the first candidate is not confirmed, the system increases the index indicating the number of turns by one, and applies the rule in S1802 again.

In the second pass through S1805, further input data is received from the user and the system selects a second candidate character sequence. The further input data received by the system from the user is directed to the sequence extractor module S2, which returns a second candidate as has been described above. In the second pass through S1807, the second candidate sequence suggested by the sequence extractor module S2 is spelt back to the user. After the second pass through S1809, a second confirm request is performed.

If confirmation is obtained, the system proceeds to dialogue state S1811, "inform about success". The response generator S4 then generates a response such that the system informs the user about the success. This is performed by the response generation and the TTS. The system may then handover to a dialogue module, as will be described below.

Optionally, the system may proceed to a further dialogue state S1813, resulting in the system outputting a farewell message and then proceeding to the next step. The next step depends on the use case.

Optionally, the dialogue policy S3 further implements an error prediction step. This is also referred to as a "misspelling prediction". The dialogue policy module S3 applies a further rule that determines if the sequence extractor module S2 has not extracted any valid sequences or if the suggested sequences have been guessed before. Although, not shown in FIG. 7, it will be understood that the rule corresponding to the error prediction step may be performed between S1805 and S1807 in FIG. 7. If the further rule determines that the sequence extractor module S2 has extracted a valid sequence that has not been guessed before, the dialogue policy proceeds to dialogue state S1807. If the further rule determines that the sequence extractor module S2 has not extracted any valid sequences or if the suggested sequences have been guessed before, the dialogue policy S3 module returns a dialogue state "ask the user to spell the sequence". This output is passed to the response generation module S4, and a system response is output to the user which asks the user to spell the relevant sequence to be captured. If the sequence extractor S2 is again unable to return a valid sequence, the dialogue policy S3 performs an error prediction step.

The error prediction step will provide a further candidate sequence based on the most likely error in the previous selected sequences (e.g. if the system had incorrectly guessed "ABCF", it would make a second guess of "ABCS", since F and S are often confused). The prediction step will determine a further candidate based on previously selected candidates and return the further candidate. The dialogue policy returns state S1807 with the new candidate and proceeds from there.

It has been observed that a number of incorrect guesses are incorrect by only one letter. Most of these incorrect guesses are due to similar sounding letters that cause confusion, such as: F and S, Y and I, and M and N. The probability that a character has been confused for another character may be computed offline and the most probably confusion characters together with computer probabilities stored. The pre-computed probabilities may be obtained as follows: (i) generating a set of random alphanumeric 8-character and 10-character codes (e.g., 1000 codes), running them through the sequence extractor module S2 and checking manually for the most common confusions; and/or (ii) testing the system with actual dialogues using different input codes (e.g., UK postcodes), and manually checking the most common confusions in these dialogues. The probabilities are obtained based on how often a character is confused for another.

The pre-computed probabilities may be referred to as character confusion rates. For example, for the character "5", the system may store the following characters and confusion rates: [F, 0.002841918294849023], [Y, 0.00017761989342806393] and [K, 0.00017761989342806393]. For the character "0", the system may store the following characters and confusion rates: [0, 0.0015985790408525756], [T, 0.00017761989342806393] and [F, 0.00017761989342806393]. Confusion rates may be stored for certain characters only. Confusion rates may be stored for one a fixed number of characters corresponding to each character only, for example only the highest probability may be stored.

The misspelling prediction step comprises the following steps:
for each of the previous guesses;
   select the character with the highest character confusion rate stored and replace it by its most probable alternative; and
   select the corrected guess where the character confusion rate is the highest as long as the corrected guess does not correspond to one of the previous guesses.

In this procedure, only a single character is edited. However, it would be possible to allow for multiple characters to be edited.

There are a small proportion of turns where the system cannot make a valid guess. This is either because the ASR module picked up very little or the sequence extractor has already guessed all the valid sequences in the turn's N-best-list. The error prediction step ensures a code is guessed and returned to the user as the spelt code, even if the sequence extractor S2 does not return a valid guess. It has been found that "any guess is better than no guess". The misspelling prediction step provides a spelt code even in cases where the ASR S1 picks up very little or the sequence extractor S2 has guessed all the valid codes in an N-best list. With reference to FIG. 8, by ensuring that a spelt code is guessed and returned, the misspelling prediction step reduces the number of times the contingency verification module 1401 has to be called for example.

The dialogue policy S3 is a multi-turn dialogue policy, comprising re-prompts and confirmations. By 'reprompt', it is meant that the user is prompted to re-spell the code multiple times during the conversation, and not only at the beginning of the conversation.

The response generation module S4 associates a current dialogue state of the policy module S3 with a predefined template of text to be output to the user. A pre-defined template is associated with each dialogue state in the policy. The dialogue states are shown in FIG. 18 for example. Each of the stages S1801, S1803, S1805, S1807, S1809, S1811 and S1813 is a dialogue state. It will be understood that further dialogue states may be included. Each of these states has an associated template. Once the dialogue state is determined, there is a corresponding dialogue act associated with the dialogue state, and there is a corresponding template that is used for corresponding dialogue states and acts.

Examples of possible dialogue states and of the corresponding template generated by the response generation module S4 are described below. One or more of these dialogue states and templates may be included in the dialogue policy S3 and the response generator S4:

The dialogue state "Greeting" S1801 corresponds to the template "hello".

The dialogue state "Back off to contingency detector" S1803 corresponds to the template "Sorry, I didn't get your number. Please type it using your phone keypad now" for example.

If the conversation is at a stage (dialogue state) where an input code is required from the user, the response generation module issues a request such as "Thank you. Now please spell out the target code", or any other variant that conveys the same message to the user. Thus if the current dialogue state is "ask the user to spell the sequence", corresponding to S1805 in FIG. 18, the issued response is "Now please spell out the target code".

The dialogue state "Inform about success", corresponding to S1811 in the figure corresponds to the template "Thank you, the code has been inputted" or similar.

If the dialogue state is that the system could not extract a code (not shown in FIG. 7), then the response generation module issues a request such as "I didn't quite understand that. Could you please spell out your target code again?" Although this dialogue state is not shown in FIG. 7, it will be understood that the system may enter this dialogue state between S1805 and S1807 in FIG. 7. The system may also enter this dialogue state after the optional error prediction step described above has been performed.

After the user provides an input, the response generation module outputs said input to the user, corresponding to dialogue state S1807 and requests confirmation, corresponding to dialogue state S1809. The template may include a message such as "Ok, now I heard <user text>. Is that correct?", where <user text> is the text to be provided to the user. The <user text> may use NATO spelling for example (NATO spelling is described further below).

If the conversation has exceeded the maximum number of turns minus one, i.e. the "last try" dialogue state, the response generation module issues a warning such as: "This is your last try".

If the character sequence determination 1000 is used to verify an input provided by a user and the user has been unable to provide a code that matches a reference code (not shown in FIG. 7), the response generation module may issue a message such as "Sorry, the code you provided does not match our records. The payment will be rejected." Although this is not shown in FIG. 7, it will be understood that the system may enter this dialogue state if the condition of S1802 ("Maximum number of turns exceeded") of FIG. 7 is positive. This state may be an alternative or in addition to S1803.

The dialogue state "Goodbye and proceed" S1813 corresponds to the template "Goodbye".

First Example

An illustrative example of a use case in the capture scenario is described next. In this first example, a four letter code with no numbers is expected. The code that the user wishes to provide is ATFG, for example.

The system asks the user to spell out the code.
The user speaks the code and a first N-best-list with N=3 is obtained. For example the N-best list comprises ["A T S G", "A to F G", "A tea F G"].
After post-processing of all items, the first item in the list is "ATSG" and is a valid 4-letter code. Therefore, the first item "ATSG" is taken as the selected candidate code and the user is asked to confirm "I heard ATSG is that correct?"
The user says "no"
The system asks the user to spell out the code again.
The user speaks the code and we get a second N-best-list: ["A T S G", "A to F G", "A tea F G"]. The value of N=3 is unchanged.
Going down the second N-best-list one by one:
  The first candidate, although a valid candidate code, has already been guessed and is ignored.
  The second candidate is post-processed to "A 2 F G" (as "to" is phonetically identical to 2). As this candidate does not match a 4-letter code (no numbers allowed) as specified by the first regex, it is also ignored.
  Similarly to the second candidate, the third candidate is processed to "A T F G". This is a valid candidate that has not been guessed before, so it is selected as the spelt code by the system.
The system sees "ATFG" as a valid 4-letter code and asks the user to confirm "I heard ATFG. Is that correct?"
User says "yes"

Second Example

An illustrative example of a use case in the verification scenario is described next. In the second example, the user must verify its flight booking reference code. A six-character alphanumeric code is expected this scenario, and the correct code is already stored. In this example the correct code is WM13ET.

The system asks the user to spell out the code.

The user speaks the code and the N-best-list is obtained. Here N may be 10 for example. The first item of the N-best list is obtained as ["W N 1 tree E tea"]. Note that a further nine items are also obtained; however, for this example the remaining items are irrelevant and will not be listed.

For the first item, the sequence extractor S2 converts "tree" to "3", and "tea" to "2", coming up with the code "W N 1 3 E T". "W N 1 3 E T" is a valid code and is taken as the spelt code. The user is asked to confirm if "W N 1 3 E T" is correct.

The user says "no"

The system asks the user to spell out the code again.

The user speaks the code and a second N-best-list is obtained. N=10 and is unchanged. The second N-best list does not contain any valid 6-character code. The system then asks the user to spell the code one more time.

There is again no valid 6-character code, so the dialogue policy S3 activates the error prediction procedure. The error prediction procedure returns the code W M 1 3 E T, which is a one-off edit compared to the previously tried code.

The system sees "W M 1 3 E T" as a valid 6-letter code and asks the user to confirm "I heard W M 1 3 E T. Is that correct?"

User says "yes"

System confirms that the verification has been successful.

Note that the above example is a rare case and is provided only for illustration. In practice, such examples are not generally encountered. The above sequence detection can be resolved more quickly (in less turns) if the ASR detects M instead of N automatically in the second spelling (as the user might put more focus on spelling that particular character or the user might even use NATO spelling for that character: "Mike").

The method described in relation to FIG. 4 has been evaluated through a series of quantitative evaluation experiments with different types of standard codes such as credit card numbers, UK postcode addresses, 6-character alphanumeric reference numbers, the first line of UK addresses, social security numbers, etc. In the experiments, the method used the feature of maintaining history and the feature of error prediction. The evaluation protocol was run with a variety of human subjects who are native speakers of the US and UK varieties of English via telephone calls. Before the call, each human subject would get assigned the task: the actual sequence that must be communicated with the system on the other side of the line. The evaluation metric was call-based success rate. A call is successful if the system is able to guess the correct code before the dialogue ends (i.e., before the maximum number of dialogue turns or system guesses is exhausted, with the maximum number of the system's guesses set to 3). The results with several standard character sequence types in the capture scenario are provided in Table 1 below.

In Table 1, rows two to nine represent the different types of codes (e.g. Address (UK), 6-character ref number, etc. . . . ) that were evaluated. The column "Success $1^{st}$ turn" represents the percentage of detected character sequences that are confirmed by the user following a first confirm request (that is, in the first turn). The percentage is calculated the number of confirmed sequences in that turn out of the total data size for the test. The column "Success $2^{nd}$ turn" represents the percentage of detected character sequences that are confirmed by the user following a second confirm request to confirm a second guess by the multi-turn character sequence determination (that is, in the second turn). The column "Success $3^{rd}$ turn" shows corresponding success rates in the third turn. The column "Success Final" represents the overall success rate of the multi-turn character sequence determination, while "Other/Failure" shows the percentage of tests where a sequence could not be extracted.

TABLE 1

The results of multi-turn character sequence determination (also per turn) for several standard character sequence types in the capture scenario

| Series | Success $1^{st}$ turn | Success $2^{nd}$ turn | Success $3^{rd}$ turn | Success Final | Other/Failure | Data size for test | Country |
|---|---|---|---|---|---|---|---|
| Address (UK) | 94% | 4% | 2% | 100% | 0% | 144 | UK |
| 6-character ref number | 79% | 13% | 2% | 94% | 6% | 314 | US |
| Postcode (UK) | 76% | 12% | 4% | 92% | 8% | 409 | UK |
| 4-character ref number | 70% | 17% | 7% | 94% | 6% | 382 | UK, US |
| name | 60% | 14% | 6% | 80% | 20% | 373 | UK, US |
| 8-character ref number | 57% | 14% | 9% | 80% | 20% | 202 | US |
| Phone number | 54% | 41% | 3% | 98% | 2% | 153 | US, UK |
| Credit card number | 82% | 5% | 6% | 93% | 7% | 409 | US, UK |
| SSN | 58% | 38% | 3% | 99% | 1% | 164 | US |

The character sequence detection model 5 may be understood as a specialised dialogue system which is applied solely for the purpose of collecting target character sequences—once this is done, it hands off further work to another task-oriented dialogue system that will help the user to accomplish their task (e.g., changing its flight or train booking, getting information on their package, changing their restaurant reservation). This conversational flow is illustrated in FIG. 8.

In use, once a sequence is obtained, if the capture or verification is successful, the user is allowed to access a dialogue system (e.g. task-oriented dialogue system) or to perform another task or access another service such as flight booking or restaurant reservation. Alternatively, if the capture or verification is successful, the user is directed to a human worker in a customer support call centre.

FIG. 8 illustrates a conversational system 1400 comprising a character sequence detection module 1000 and dialogue module 200 used for automation of a capture or verification step. The system 1400 may be a system such as described in relation to FIG. 1. The character sequence detection module may implement a method such as has been described above. The dialogue module may be any dialogue system, for example a task oriented dialogue system. An example of a dialogue system is described below in relation to FIG. 9.

When used for capture, a character sequence input from a user may be required by the conversational system 1400 and the character sequence determination module 1000 is used to capture this input. In this case, the dialogue module 200 calls the character sequence determination module 1000 at a particular stage in the dialogue at which a character sequence input is required. The character sequence determination module 1000 then performs the character sequence determination and provides the output character sequence (i.e. the confirmed character sequence) as input to the dialogue module 200. The confirmed character sequence may be stored in memory for the current conversation and can be accessed by the dialogue module 200 during the course of the current conversation, depending on the actual task and conversation scenario. For example, if the user calls about utility bills and provides its postcode, the dialogue module 200 can reference the postcode later on: e.g., "Sure, we'll send our worker to fix your problem at: POSTCODE". In yet another example, if the user provides its credit card number, it can be used by the dialogue module 200 for the transaction later on. In the capture scenario, the confirmed character sequence is provided to the dialogue module. The next user input (third input data) is then provided to the dialogue module 200, which continues with the dialogue with the user as normal.

For example, in a restaurant booking scenario, it may be required to capture the user phone number. The character sequence determination module 1000 is used to capture the phone number. A phone number is extracted from the input user speech by the character sequence determination module 1000 in the manner described above. If input data indicating that the phone number is confirmed is received, the phone number is provided to the dialogue module 200. The dialogue module 200 then continues with the next output to the user, which is specified by the dialogue state of the dialogue module 200 as normal. For example, the next output may be "Please confirm if there are any dietary requirements". The next user input (third input data)—e.g. "No dietary requirements"—is then provided to the dialogue module 200, and processed in the normal way. The dialogue module 200 determines, based on the third input data, a dialogue act that specifies speech or text information and outputs, by way of the output, the speech or text information specified by the determined dialogue act. The output corresponding to the dialogue act in this example may be "Thank you, your booking is complete".

When used for verification, the character sequence determination module 1000 is used to extract a sequence from the user in order to verify that the extracted sequence matches the stored reference sequence. An example is the obtaining of personal information such as date of birth or a PIN code in order to authenticate a user. In this case, the character sequence determination module 1000 is used initially, before the dialogue module 200. The character sequence determination module 1000 then calls the dialogue module 200 once verification is confirmed. The next user input (third input data) is then provided to the dialogue module 200, which continues with the dialogue with the user as normal.

For example, the character sequence determination module 1000 requests the user to provide their passcode. The character sequence determination module 1000 is used to capture the passcode. A passcode is extracted from the input user speech by the character sequence determination module 1000 in the manner described above. If input data indicating that the phone number is confirmed is received, the dialogue module 200 is called and provides the next output, which is specified by the dialogue state of the dialogue module 200 as normal. For example, the output may be "How may I help you?". The next user input (third input data)—e.g. "Please let me know my balance"—is then provided to the dialogue module 200, and processed in the normal way. The dialogue module 200 determines, based on the third input data, a dialogue act that specifies speech or text information and outputs, by way of the output, the speech or text information specified by the determined dialogue act. The output corresponding to the dialogue act in this example may be "Your balance is £500".

The character sequence detection module 1000 interacts with a user to extract a sequence. As described in relation to FIG. 3, the character sequence detection module 1000 comprises a speech recognition (i.e., speech-to-text) module (S1 in FIG. 2), its own sequence extractor module (S2 in FIG. 4), and its own dialogue policy module (S3), as well as its own Response Generation (S4) and Text-to-Speech (TTS) (S5) modules. Alternatively, the character sequence determination 1000 may utilise the same TTS module as that used by the dialogue system 200.

FIG. 8 shows a verification scenario. In use, once a sequence is obtained by the character sequence detection module 1000, if the verification is successful, the user is allowed to access the dialogue system (e.g. task-oriented dialogue system). In FIG. 8, interaction with the multi-turn character sequence detection module allows for full automation of the verification step before letting the user access another step of conversation, which could be either with another task-oriented system or a human worker in a customer support call centre (e.g., for flight booking or restaurant reservation).

If verification is unsuccessful, the user is directed to a contingency verification module 1401. A contingency verification module 1401 is called. The contingency verification module 1401 comprises DTMF and/or SMS based verification, wherein the user presses keys on a telephone keypad or sends an SMS text message to provide verification. Alternatively or additionally, the contingency verification module 1401 relies on a human based worker to perform verification. It will be appreciated that verification by the contingency module 1401 may require longer verification times since it relies on a user typing information (pressing keys on a keypad or typing an SMS message) or requires accessing a human operator. Verification by the contingency module 1401 may require additional resources such as, e.g. call centres bandwidth, in the case of verification by a human operator.

The character sequence detection module 1000 acts as a 'gatekeeper' that: (i) captures a sequence that is then used by the conversational system, or (ii) verifies that a sequence inputted by the user corresponds to a stored reference sequence. The character sequence determination module 1000 enables automatic capture or verification and, by having improved sequence detection rates, it reduces the number of occurrences where a contingency verification module has to be called. Thus, the conversational system 1400 may exhibit shorter capture or verification times (since the capture or verification is carried out automatically by the determination 1000 rather than by the contingency module 1401) and require less call centre bandwidth (since the need for human based verification by the contingency module 1401 is reduced). This results in less resource utilization. For IVR systems in particular, in case an obtained character sequence is inaccurate, human operators (e.g. in call centres) may be required to obtain the correct character sequence. This leads to increased processing times and requires increased call centre bandwidth. The multi-turn character sequence determination module, by virtue of its improved accuracy, reduces the need for human operators and call centre bandwidth and therefore provides faster processing times and decreases resource (e.g. call centre bandwidth) utilisation.

FIGS. 3 to 7 show an example character sequence determination module 1000 which may be used in the system of FIG. 8 for example. FIGS. 9 to 15 describe an example dialogue module 200 which may be used in the system of FIG. 8.

Figure 9:
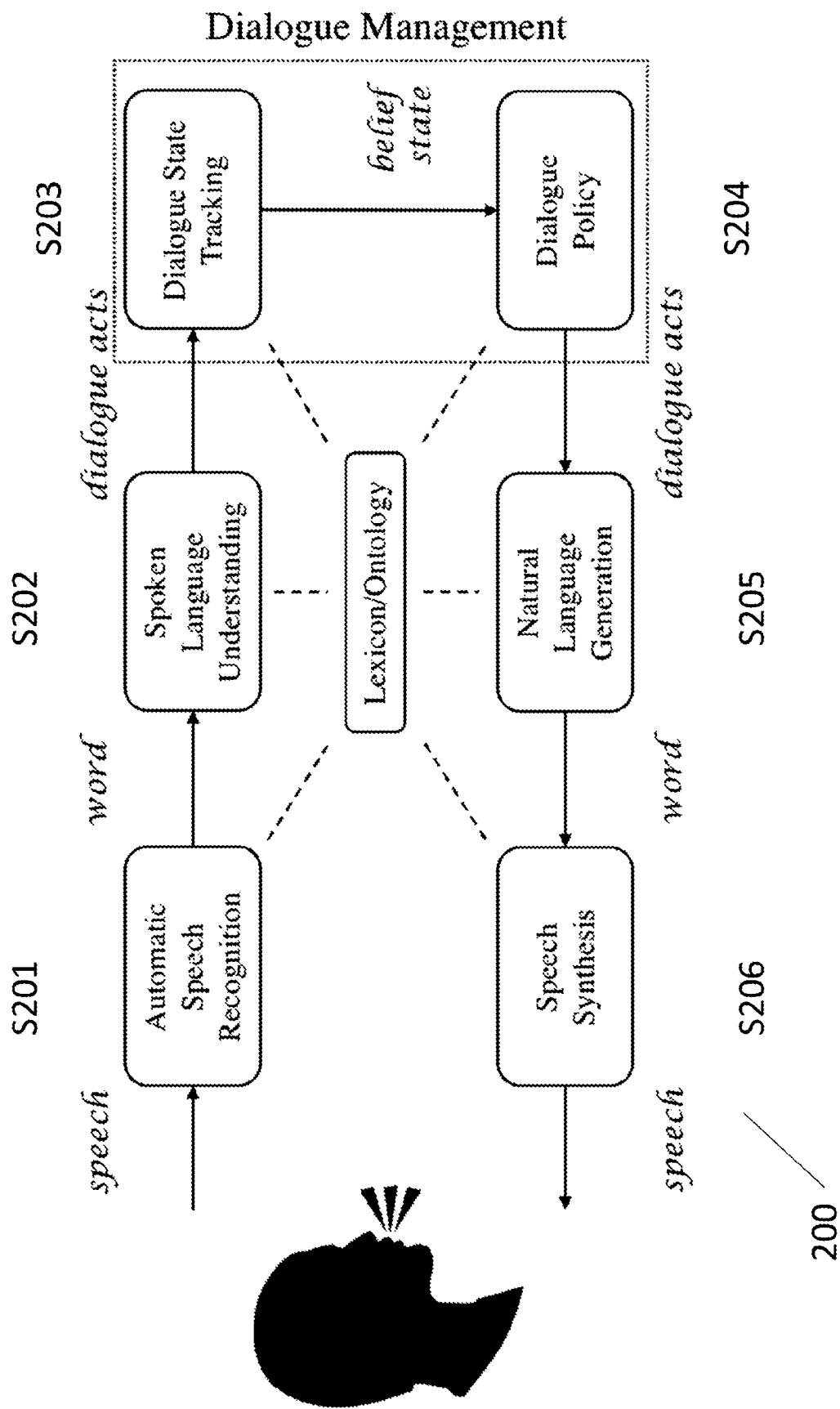
FIG. 9 shows a schematic illustration of a dialogue module in a system in accordance with an embodiment.

FIG. 9 shows a schematic illustration of an example dialogue model 200, in which a dialogue system interacts with a human user. Each stage S201 to S206 can be considered a separate module. The dialogue system illustrated is a goal-oriented dialogue system. The term goal-oriented may be used interchangeably with the term task-oriented. Goal-oriented dialogue systems search and interact with large databases which contain information about a specific dialogue domain. Examples of such domains are 1) restaurant search and reservation, 2) flight bookings, 3) tourist information, 4) laptop shopping, and 5) train ticket sales, amongst others.

Each dialogue domain is defined by a domain ontology. The domain ontology comprises information which can be used to model the user goal expressed up to a given point of the conversation. This point of the conversation is referred to as dialogue state. The domain ontology comprises one or more slots. Each dialogue slot corresponds to a subject that a speech signal may relate to. The dialogue slots may have one or more corresponding values. The dialogue slot may take on one or more of the values. A dialogue state thus comprises a set of one or more slots with their corresponding slot values. A dialogue state can contain more than one slot, and value combination, for example, a dialogue state can be specified by the fact that both food type and desired area are known at that point in the dialogue, so both the food type slot and area slot have a corresponding value or values. The dialogue states are defined by the domain-specific ontology. A dialogue state comprises the constraints the users can express using a collection of one or more slots (e.g. "price range" or "food") and their slot values (e.g. "cheap", "expensive", or "Thai", "Chinese", for these two slots).

An example of a simple domain ontology which relates to the domain of restaurants in Cambridge, for the task of restaurant search and reservation, is provided in FIG. 10. In this example ontology, there are a plurality of informable slots. The informable slots comprise: "price range", "area", "food", and "name". Each informable slot may take on one or more values. For the "price range" slot, the values are "cheap", "moderate", and "expensive" for example. For the "food" slot, the values are "Afghan", "African", "Afternoon tea", . . . . The informable slots represent attributes which the user can use to constrain the search for an entity in the database (e.g. the food slot is used to constrain the search fora restaurant in a database of restaurants), and have corresponding values (e.g. Afghan). The ontology may further comprise a set of requestable slots. The set of requestable slots are slots which do not have corresponding values, such as the slots "postcode", "address", "signature", . . . . The requestable slots represent attributes relating to the entities in the database which the users can ask about, but not use as search constraints.

A dialogue system for restaurant search and reservation should help the users to find and book a restaurant according to their personal taste and wishes: for example the system should book a place with cheap Thai food in central Cambridge, or recommend a cheap Chinese place in North Cambridge if the user makes inquiries about such places.

The system receives an audio input from a human user. The audio input may be received through a microphone located remotely from the system, and the audio signal transmitted to the dialogue system for example. Each audio input corresponds to a turn in the dialogue. A dialogue turn is a conversational unit within turn-taking dialogues, which comprises the previous system utterance and the current user utterance.

In S201, an automatic speech recognition (ASR) step is performed, to generate a text signal from the audio input. Any type of speech recognition process may be used in the speech recognition step. For example, a trained speech recognition algorithm based on a neural network or Hidden Markov Model may be used. ASR models may assign posterior probabilities to words in an utterance given the input acoustic signal. The ASR output takes the form of an N-best list, which approximates the full posterior distributions over the ASR hypotheses by returning the top N most probable hypotheses with their respective probabilities. Alternatively, word lattices or word confusion networks may be used. In an embodiment, only the top scoring ASR hypothesis is used as input to the subsequent steps. Optionally, the character sequence determination 1000 may utilise the same ASR as that used by the dialogue system 200 of FIG. 9. In this case, ASR S1 is identical to that described in relation to S201 of FIG. 9.

In S202, a spoken language understanding step is performed. This gives a "turn-level" prediction. A dialogue state tracking stage is performed in S203, which generates an updated belief state. The belief state comprises the system estimate of dialogue state information, for example the system estimate of the slot value combinations that have been mentioned by the user. The spoken language step and dialogue state tracking step together form a natural language understanding (NLU) stage. The output of the step S203 is an updated belief state. As described above, the dialogue state comprises one or more slot-value combinations. The belief state comprises the system's estimation of dialogue state information. In the belief state, a probability value may be assigned to slot value combinations. Combinations not in the belief state are considered to have a probability of 0.

A dialogue management step is then performed in S204, in which a system act is determined. The updated belief state is taken as input. Other information may also be extracted from the input utterance and inputted to the dialogue management model, for example the system estimate of the user act type, or action and/or the system estimate of any requestable slots mentioned. In this step an appropriate system response is selected following the latest user utterance. This selection is made based on the user utterance, dialogue context (i.e. history of the current conversation), and any additional external information (such as the result of a booking attempt). The dialogue manager uses the updated belief state to determine the system act, which is the dialogue act representation of the dialogue system's response to the user utterance. The terms dialogue management and dialogue policy model are used interchangeably in this specification. The dialogue management in step S204 may be performed using a rule based approach or a learning-based method such as reinforcement learning and supervised learning.

The system and user dialogue acts comprise one or more dialogue act types. Dialogue act types correspond to the general action of the utterance. A set of pre-defined dialogue act types are used to generate the system dialogue acts. Each dialogue act type has a corresponding dialogue act argument. The argument may be empty, for example where the act type is "greeting". In task-based systems, the argument may be one or more slot-value pairs. For request acts, the dialogue act argument may be an attribute of an entity. Examples of dialogue acts include inform(food=British) or request(address).

The chosen system act is then run through the Natural Language Generation (NLG) module to construct and output the system utterance from the dialogue act in S205. Thus in S205, a natural language generation step is performed to generate a textual response based on the system action. In S206, text to speech generation is performed to generate a speech signal, which is then output to the user as an audio signal. Any type of text to speech generation process may be used in this step. This step may alternatively be omitted, and the text signal output directly to the user, on a screen for example. Operating with text output can also allow hearing impaired people to use the system for example.

Figure 11:
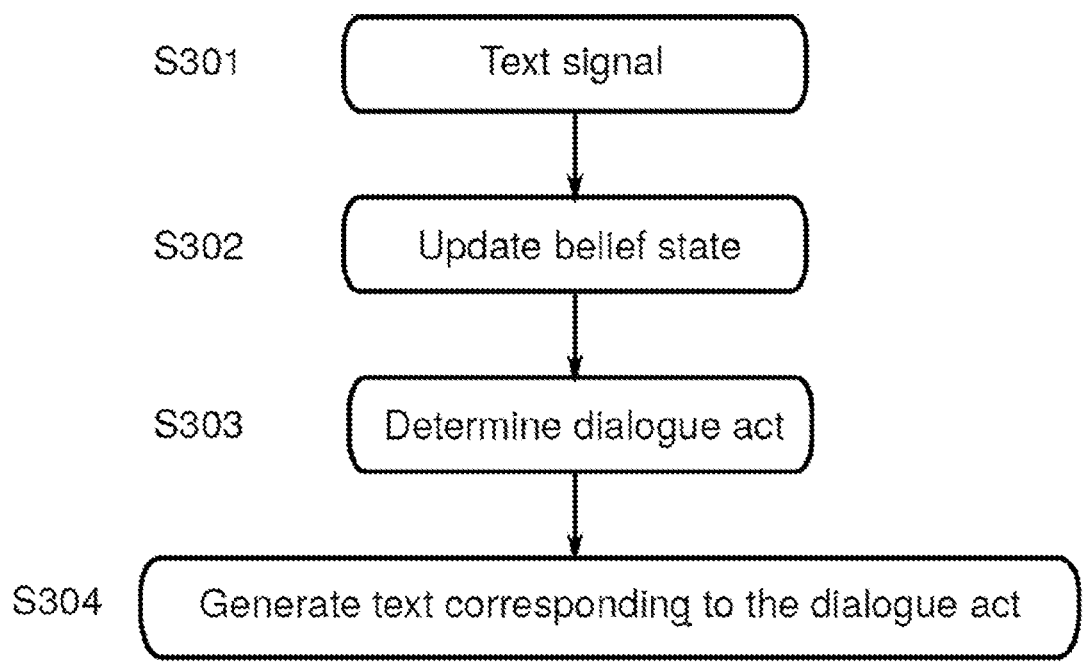
FIG. 11 shows a flow chart illustrating the processing stages included in a dialogue method according to an embodiment.

FIG. 11 shows a flow chart illustrating the processing stages included in a dialogue method according to an embodiment. The method is performed by a dialogue module 200 as has been described in relation to FIG. 8 for example.

In step S301, a text signal is inputted. The text corresponds to a turn in a dialogue. As described above, the text signal is generated from an input audio signal using an automatic speech recognition method. The input signal may be "I would like Chinese or Greek food" for example.

In S302, a belief state is updated based on the input text signal S301. The belief state comprises a probability value corresponding to each of a plurality of dialogue options, each dialogue option comprising a slot and a corresponding slot value. The belief state update based on the input text signal may be performed using various methods. The belief state update step S302 may comprise spoken language understanding (SLU) and dialogue state tracking (DST) for example.

The role of a Spoken Language Understanding (SLU) module, also known as a semantic decoder, is to convert text (i.e. ASR output) into dialogue state information. The subsequent Dialogue State Tracking (DST) module uses this information to update the system's belief state, which is a probability distribution over possible dialogue options (e.g. slot and value combinations). This distribution is then used by the dialogue manager in S303 to choose an appropriate system response, i.e. a dialogue act, in the manner that will be described below.

SLU may use rule-based methods such as template matching or grammar-based methods for example. Alternatively, data-driven methods can be used, in which statistical models learn from annotated data. Techniques including Inductive Logic Programming, Generative Probabilistic Models, Weighted Finite State Transducers, Support Vector Machines and many others may be used for example. SLU may also be treated as a sequence labelling problem, where each word in an utterance is labelled according to its role in the user's intent. Labelling models such as Conditional Random Fields or Recurrent Neural Networks can be used. An example method is described below, but as may be appreciated, other methods of SLU may be used.

An example SLU module comprises a plurality of independent binary statistical models (for example artificial neural networks), each trained to decide whether a specific slot-value pair was expressed in an input user utterance. Given annotated training data, these models can learn which lexical features are good indicators for a given value and can capture elements of paraphrasing. During implementation, features representing the input text signal from S301 are extracted and inputted into the binary models. For example, vector representations of words in the utterance may first be extracted. A single fixed length feature vector representing the utterance may then be generated from the vector representations, for example using a convolutional neural network. Features from the previous system act may also be included. Each model gives a binary output, indicating a probability that the slot value pair corresponding to the model was expressed in the utterance. The SLU module therefore outputs a probability value corresponding to each slot value pair, indicating the probability that the value was mentioned. During training, the same features are extracted and inputted into the binary models. Again, each model gives a binary output, indicating a probability that the slot value pair corresponding to the model was expressed in the training utterance. The training data further comprises labels indicating the slots and values mentioned in the utterance, and these are therefore used to train the models to correctly determine whether the slot value pair was expressed in the utterance. In this example, the SLU module therefore outputs a probability value corresponding to each slot value pair. Other types of SLU may be performed however, resulting in different format outputs. The outputs are then used to update the belief state in the subsequent dialogue state tracking step.

The belief state is the system's estimation of current dialogue state information. For slot-based systems, the dialogue state information comprises constraints that the user has expressed up to that point in time. For example, the dialogue state may comprise goal constraints for each of the informable slots, where each goal constraint comprises a value. The belief state comprises the system estimate of the slot and value combinations mentioned by the user in the dialogue. Additional information may also be determined, for example the system estimate of the user dialogue act type, as will be described below. Requested slots represent questions about previously suggested entities, and as such do not require belief tracking across turns. Thus the belief state may simply comprise slots and values and corresponding probability values. The DST component uses the output of the SLU step to update the belief state, which comprises a probability distribution over dialogue state information.

Figure 12:
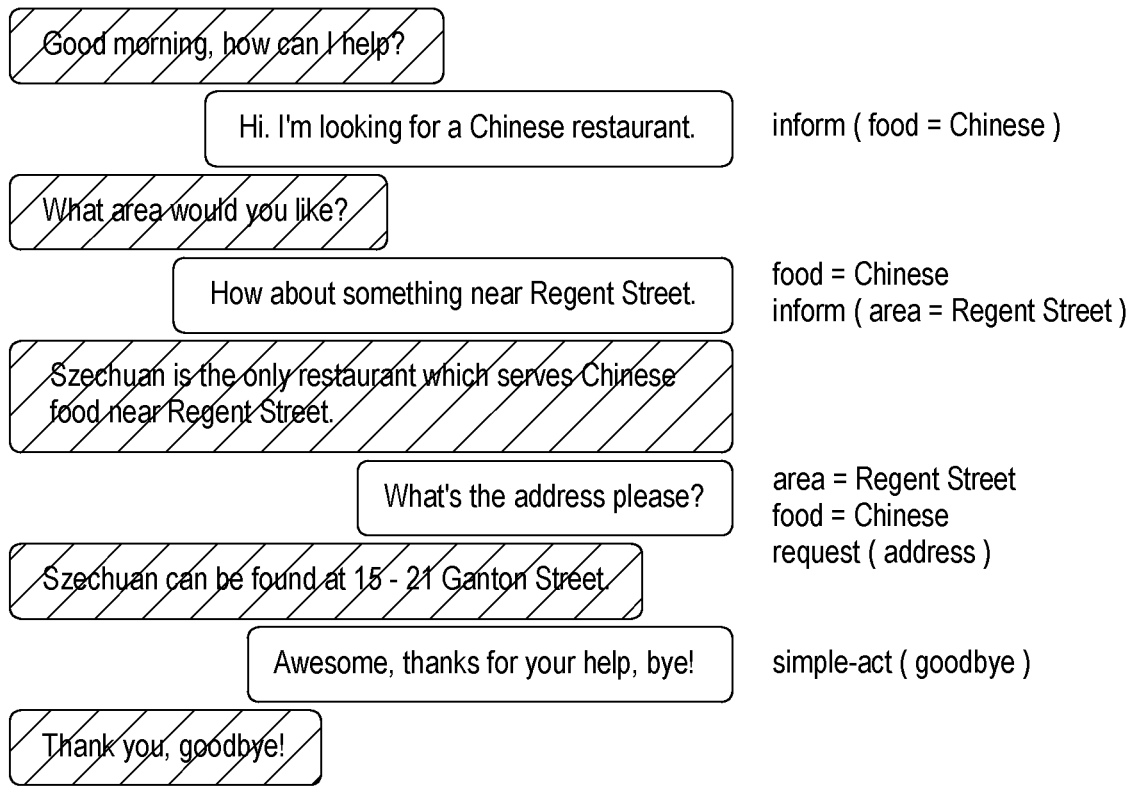
FIG. 12 shows a sample dialogue with user utterances annotated with the dialogue acts.
Figure 13:
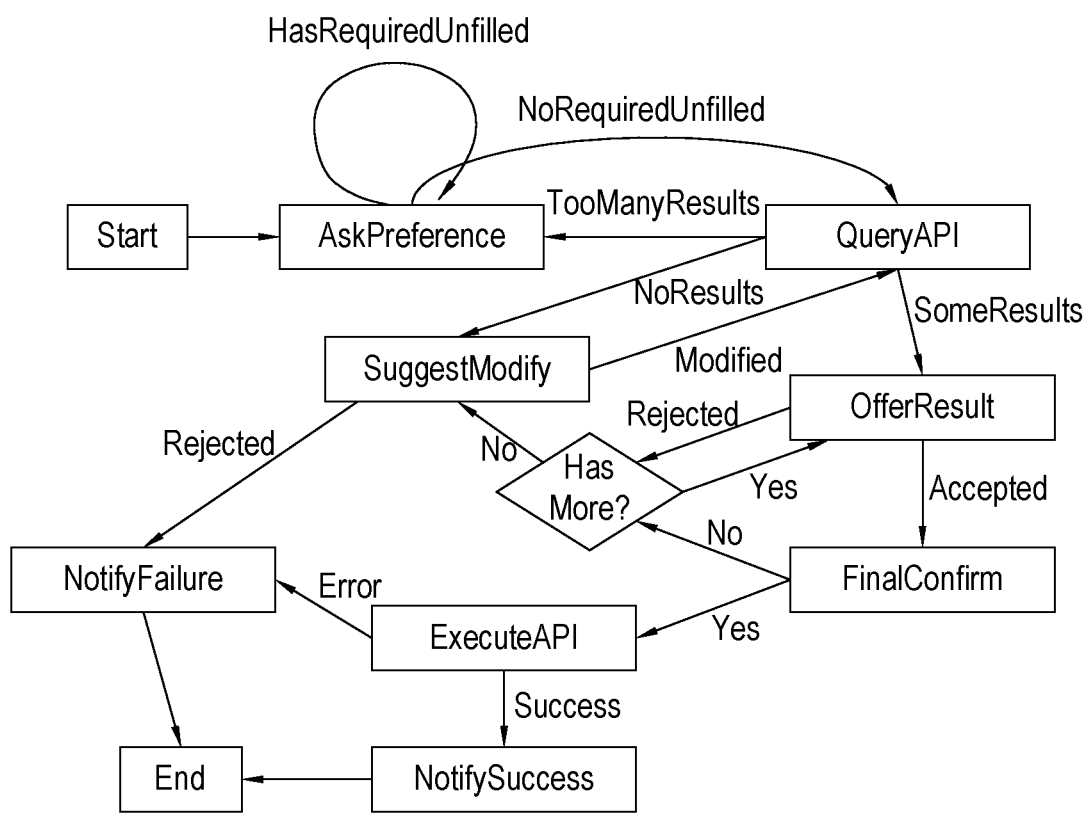
FIG. 13 shows a finite state machine-based policy model for task-independent database querying applications such as restaurant search and booking, according to an example.

FIG. 12 shows a sample dialogue with user utterances annotated with the dialogue acts. User goals in a dialogue are represented as sets of constraints expressed by slot value pairs. The text shows the slot value constraints the model stores from previous dialogue turns. The role of the DST model is to infer the best possible estimate of dialogue state information, given the history of user and system utterances in the current dialogue.

Dialogue state tracking may be based on hand-crafted systems, for example which use the top ASR/SLU hypothesis to map the existing belief state to a new belief state, for example an Information State Update model, which uses hand-crafted rules to maintain the information state. Other rule-based approaches may predict an updated dialogue state for each of the hypotheses provided by the ASR/SLU pipeline, and then use another hand-crafted rule to combine these estimates into a single belief state.

A rule-based belief state update may depend on two factors: 1) the latest user utterance (i.e., the probability distributions over the slot and value combinations generated in the SLU step); and 2) previous belief state history (in this case the previous belief state, i.e. the probability distributions over the slot and value combinations stored in the belief state after the previous dialogue turn). The most recent belief state reflects previous state history. The relative weight of the impact of the two components determines the accuracy of the current belief state. For instance, if a complete change in the user's goal is detected, the previous belief state history is weighted less, and more weight is assigned to the latest user input. An example belief state may be (Food=Indian=0.8, Food=Chinese=0.9, Area=North= 0.9, . . . ).

Alternatively, data-driven methods may be used. Data driven methods may be based on a generative approach or a discriminative approach. For example, generative Bayesian networks model dialogue as a dynamic Bayesian network where the (true) dialogue state $s_t$ (at time t) is treated as a hidden random variable. The system action $a_t$ and the observed user action $o_t$ are the observed variables. At each dialogue turn, Bayesian inference is used to obtain an updated estimate of the dialogue state $s_{t+1}$. Unlike generative models, discriminative models directly estimate the conditional probability $P(s_t|f)$, where f is the set of (arbitrary) features representing (optionally) ASR, SLU and dialogue history for example.

SLU and DST components may be separate, with the DST module operating on SLU output to update the belief state. However, models based on word-based DST paradigm may integrate SLU and DST into a single component which uses the ASR output (or text input) to directly update the belief state without an intermediate semantic decoding step. Combining the two components enables joint learning, allowing both components to make use of the information expressed in previous dialogue turns.

Alongside the SLU and DST steps which update the belief state, a dialogue act classifier or classifiers may be run, in order to determine the system estimate of the user dialogue act. Whereas the belief state stores information relating to the slot and value combinations mentioned in the dialogue, the dialogue act classifier or classifiers generate information relating to the current user dialogue act type or action, for example identifying one or more of: "inform", "request", "negate", "affirm", "greeting", "unknown", "goodbye" in the user input. The input to the dialogue classifier may be generated using the same vector representations of words in the utterance used in the SLU step. A single fixed length feature vector representing the utterance may then be generated from the vector representations, for example using a convolutional neural network. The same feature vector used in the SLU step for identifying the slot and value combinations may be used. A single multi-way classifier may be used, or multiple binary classifiers, each corresponding to an act type may be used. The classifier or classifiers may be neural networks. The information regarding the estimated dialogue act is also taken as input into the policy model. Alternative models for determination of the input user act type may be used.

Other steps may also be performed to extract further information from the user utterance. For example, one or more requestable slot classifiers may be run, in order to determine the system estimate of the requestable slot or slots mentioned by the user. For example, one or more requestable slot classifiers may be used to identify "address" in the user input. These classifiers may again use the same features as input as used in the SLU step and in the dialogue act classifiers. They may comprise multi-layer perceptrons applied on top of the feature representations to perform binary classification. Each classifier corresponds to a requestable slot. The information regarding the probability that the requestable slot was mentioned, for example all requestable slots having a probability higher than a threshold, is also taken as input into the policy model. As described above, a character sequence determination module 1000 may be called to identify a phone number for example.

The dialogue manager in S303 then chooses an appropriate system response following the latest user utterance. To do this, the dialogue manager takes the dialogue system's internal estimate of the dialogue state (the belief state) updated in S302 as input to produce the system act, which is the dialogue act representation of the dialogue system's response to the user utterance. The updated belief state information generated in S302 is therefore taken as input in S303. Other information extracted from the input user utterance may additionally be taken as input, for example the estimated user act type and/or mentioned requestable slots. The input to the policy component is the flat NLU output, i.e. the updated belief state and any additional information extracted from the input user utterance. The NLU output, i.e. the updated belief state, for a dialogue turn may comprise a probability score for one or more slot-value pairs. A rule based policy model may be used in S303, in which the desired system behaviour is manually specified. The policy model selects a system act from a plurality of stored possible system acts, based on a set of rules. The rules may be applied to the information in the belief state, the output of any dialogue act classifiers, the output of any requestable slot classifiers, a set of stored parameters specifying the system behaviour, information in the database and/or information obtained from a third party system for example. The set of system acts may comprise discourse, confirm, statement and/or request acts for example. The set of system acts may comprise one or more of the following acts:

system__discourse:
  greeting()
  goodbye()
system_confirm: based on the user statement, confirm what user just said.
  confirm(slot=value)
  confirm(slot)
system_statement: offer user the current status of the database.
  offer(name=X,slot=Val . . . )
  compare(name1=X, name2=Y, slot=val . . . )
  count(count=?, slot=val)
system_request: ask user a question. could be proactive.
  request(slot)
  request_alt(slot=val)
  request_alt(name=X)

The policy model may comprise a hand-crafted finite state machine (FSM) which encodes a set of rules for constructing system turns, with each turn comprising a response frame which responds to the user's previous turn and an initiate frame which drives the dialogue forward through a predetermined sequence of sub-dialogues. For instance, these sub-dialogues can be: gather user preferences, query a database via an API, offer matching entities to the user, allow user to modify preferences or request more information about an entity, and finally complete the transaction (booking the entity). An example of an FSM-based policy model (for task-independent database querying applications such as restaurant search and booking) is provided in FIG. 13. It is possible to pre-specify all the desired transitions, and therefore system behaviour as a response to user acts can be customised. Such engineered finite state machines implicitly define a model of expected user behaviour in the states and transitions of the system agent.

Alternatively, a learned dialogue policy may be used to map the current dialogue state hypothesis (belief state and user dialogue act) to one of the possible system actions. For example, the dialogue management policy model may use Markov Decision Processes (MDPs) to allow the dialogue policy to be learned from data using reinforcement learning. A Partially Observable Markov Decision Process may alternatively be used, in which the (true) dialogue state is treated as a hidden variable.

Figure 14:
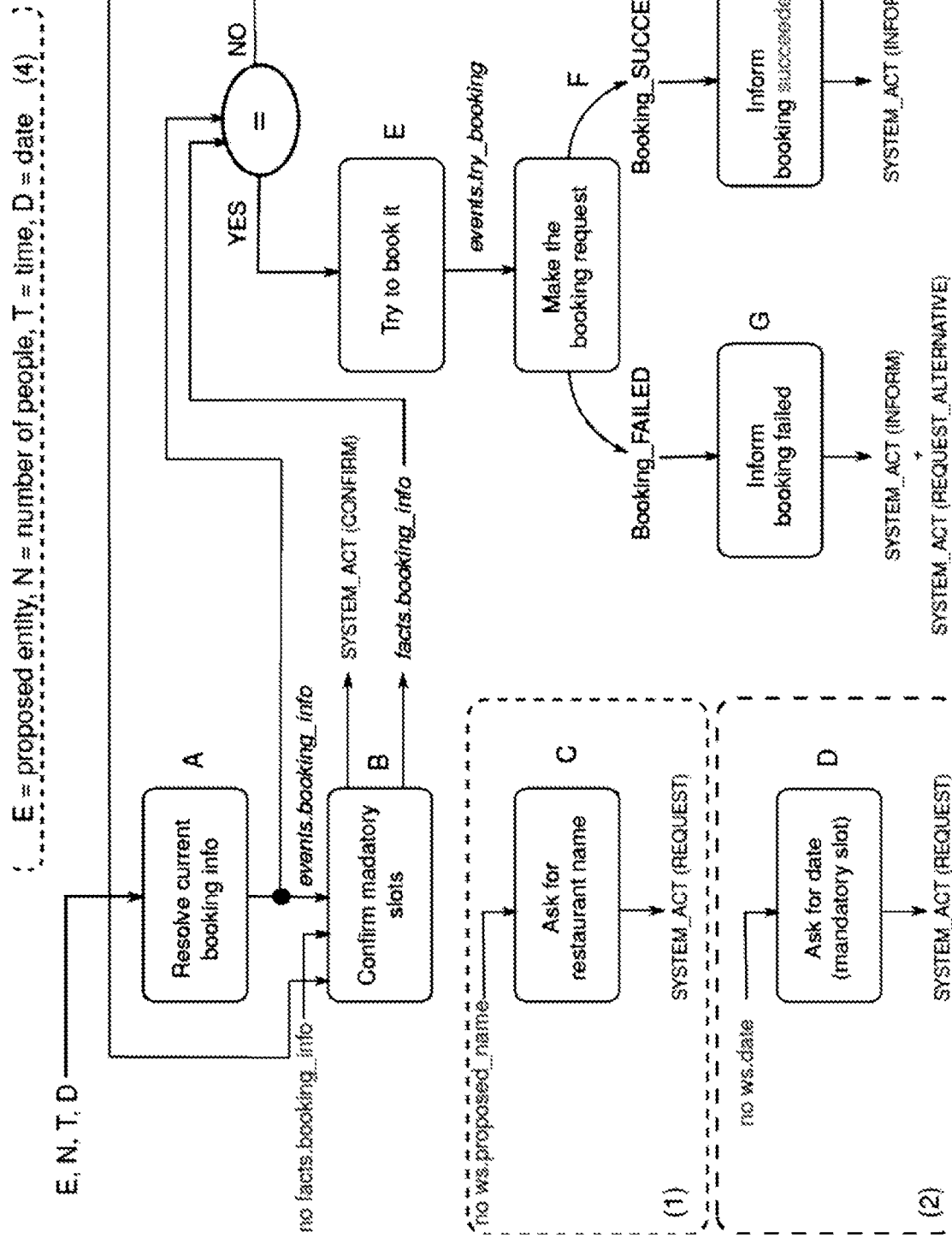
FIG. 14 shows a rule-based policy model for booking a restaurant, according to an example.
Figure 15:
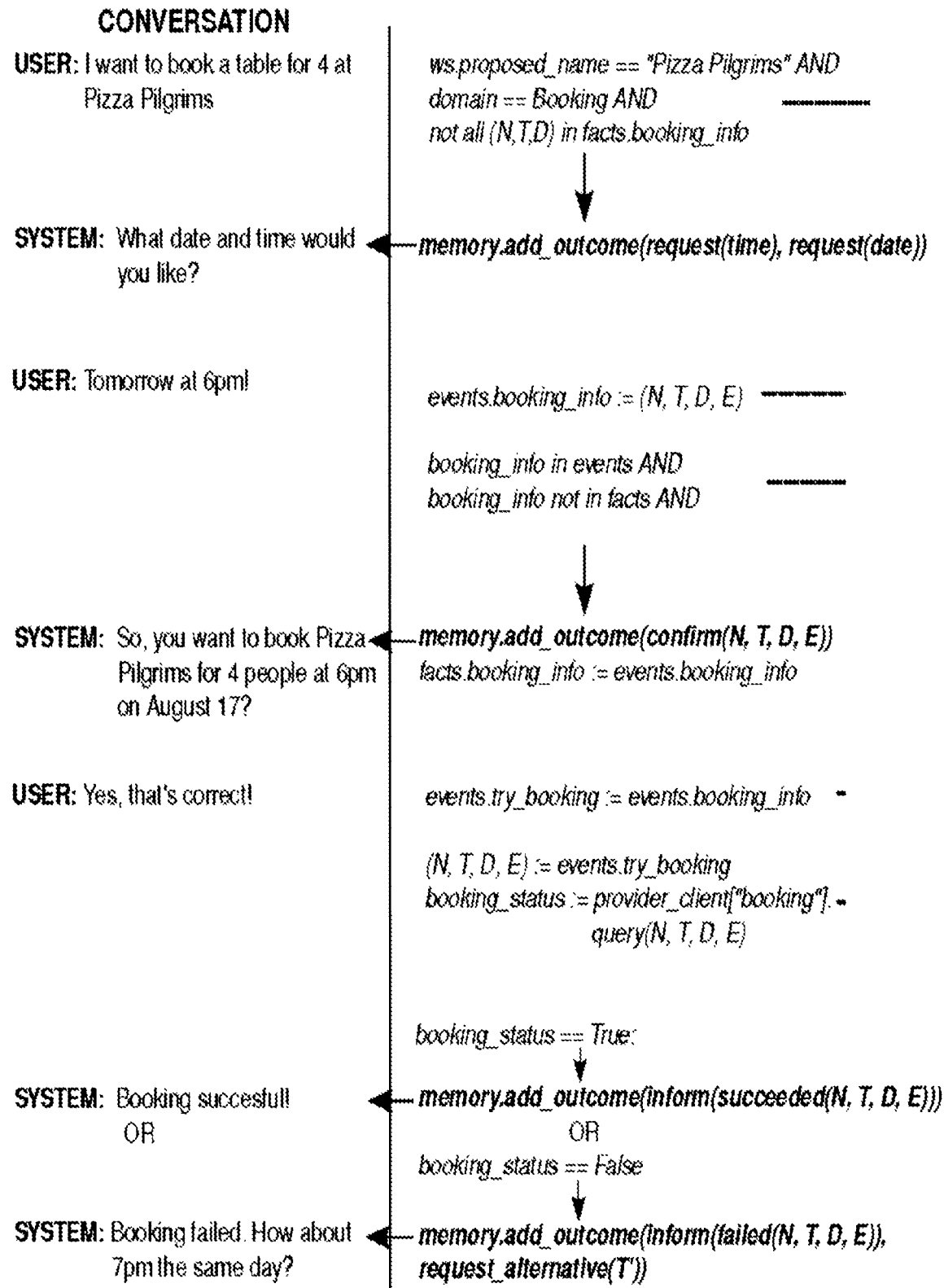
FIG. 15 shows a rule-based policy model for booking a restaurant, according to another example.

An example using a rule based approach, in which a series of rules comprising a condition relating to the belief state information are applied in S303 will be described. If a condition is fulfilled, the rule triggers, and the step specified in the rule is performed. The step may comprise a particular dialogue act being selected or a third party call being made for example. For example, an "act selection" rule may comprise a condition that: if a mandatory slot has not been specified, a request act for the slot value is triggered. In a restaurant booking example, one or more of the following rules of this type may be included: If "Restaurant name" not specified, request "Restaurant name"; If "Date" not specified, request "Date"; If "Time" not specified, request "Time"; and/or If "Number of people" not specified, request "Number of people". FIG. 14 shows a rule-based policy model for booking a restaurant, according to an example. In FIG. 14, stages C and D show the case where the restaurant name and date are not specified respectively. As can be seen, a request act is selected in each case. FIG. 15 shows the case where the first dialogue turn corresponds to stage D, i.e. the condition "If "Date" not specified" is fulfilled. Thus the first group of rules relate to blocks 1 and 2 in FIG. 14. If the proposed entity is not set (i.e. still do not know which restaurant is the intent of the user), the rule "Ask for restaurant name" will fire and one outcome will be the system act requesting the actual restaurant name (Block 1). Further act selection rules relating to confirmation of received information may be included.

Further rules relating to a third party call may be included. Such rules may comprise a condition that if the mandatory information is provided, a booking action is taken for example. The booking action may comprise the system issuing a third party call. For example, it may comprise communicating with the selected restaurant's system to determine whether it is possible to make the reservation for the current (N,T,D) combination. The booking action may have multiple outcomes. For example, in this case, there are two possibilities: the booking request succeeds or the booking request fails. Further act selection rules may inform of the outcome of the booking action. Thus if the booking request succeeds, the system fires the "Inform booking succeeded" rule which will inform the user about the success and if the booking request fails, the system then fires the "Inform booking failed" rule, which informs the user about the failure. Where the system has received alternatives from the third party system as part of the booking action, there may be two acts (one to inform that the booking failed and one to inform of one or more alternatives provided by the third party system).

Further general rules may be included, for example, a rule setting a bye act when the conversation is determined to be completed may also be included. For example, a rule conditioned on the user_action.act_type=FINISHED and "user_action.probability">0.7 for example. A further rule setting a "bye and confirm" act when the conversation is determined to be completed with a lower probability may also be included, for example when the conversation is complete with 0.5<user_action.probability <=0.7. In this case, an act 'any else I can help with?' may be issued. The user_action.act_type may be determined by the dialogue act classifier, which identifies the user input act type as has been described above. Additionally or alternatively, a rule selecting a default outcome (default dialogue act, e.g. a "can't help" act), conditioned on no outcomes having been selected (i.e. the set of outcomes stored in the working memory being empty) may be included.

As described in relation to the above booking scenario example, at each dialogue turn, a dialogue act is selected based on one or more rules. The rules may comprise a condition evaluated based on the information in the belief state and/or the world state. If a condition is fulfilled, this may select the dialogue act. Alternatively, this may trigger another type of action (for example a booking action, a resolution step, or a world state update), which in turn leads to a selection of a dialogue act through application of a subsequent rule. Where two or more conditions are fulfilled for different rules, two or more dialogue acts may be selected. Alternatively, the dialogue or acts having the highest importance is/are selected. The above described method may be implemented using three main components: 1) Working memory; 2) Engine; 3) Rules. The engine is a component that hosts and triggers the rules based on the belief state and other dialogue information stored in the working memory. The engine comprises stored code which accesses and reads the rules and, based on the outcome of each triggered rule, modifies the dialogue information in the working memory. The rule firing method fires the ones that match the conditions. For example, the engine may be implemented using the RETE algorithm which determines when each rule is applied (i.e. when the condition in each rule is evaluated).

As described in relation to the example above, rules are applied in S303 which determine the system response to the input user utterance. Other approaches, such as data driven approaches, may be used however.

In S304, a text signal corresponding to the selected dialogue act or acts is generated. In this step, a natural language generation process is performed. For example, stored utterances mapped to dialogue acts or actions may be used to convert the dialogue acts into natural language text. Alternatively, a data driven trained natural language generation module may be used. As described previously, the text signal generated in S304 may be directly outputted to the user, or may be converted into an audio speech signal, using a text to speech generation process.

Examples of the accuracy obtained with a multi-turn character sequence determination have been described in relation to Table 1. The multi-turn character sequence determination module is able to extract a string of characters with high accuracy (e.g. >90%) in a wide range of use cases. The multi-turn character sequence determination module is reliable even in diverse and imperfect speech recognition conditions. The multi-turn character sequence determination module also provides improved user experience by virtue of its accuracy. The system provides a reliable voice-based alphanumeric input mechanism that offers acceptable user experience under diverse or imperfect speech recognition conditions. This may allow wider IVR portability, quicker processing times, and/or further automation for example, since an initial identification and authentication step may be performed by the character sequence detection module, without requiring humans in the loop before proceeding. The system mitigates the impact of noisy speech recognition and inaccurate extraction through multi-turn spoken dialogue.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made.

The invention claimed is:

1. A system comprising:
an input configured to receive input speech data originating from a user;
an output configured to output speech or text information; and
one or more processors, configured to:
provide first input data to a character sequence determination module to determine a character sequence from the first input data, wherein determining a character sequence comprises:
obtaining a first list of one or more candidate character sequences from the first input data, wherein the one or more candidate character sequences comprise a plurality of individual characters which are separate units in the sequence;
selecting a first candidate character sequence from the first list;
generating a first confirm request to confirm the selected first candidate character sequence, wherein the first confirm request is outputted by way of the output;
if second input data indicating that the first candidate character sequence is not confirmed is received, generating a repeat request for the user to repeat the input character sequence, wherein the repeat request is outputted by way of the output; responsive to receiving fourth input data, obtaining a second list of one or more candidate character sequences from the fourth input data;
selecting a second candidate character sequence from the second list, and generating a second confirm request to confirm the selected second candidate if the second candidate character sequence is different from the first candidate character sequence, wherein the second confirm request is outputted by way of the output; and
if second input data indicating that the first candidate character sequence is confirmed is received, the one or more processors are further configured to:
provide third input data to a dialogue module, wherein the dialogue module is configured to:
determine, based on the third input data, a dialogue act that specifies speech or text information; and
output, by way of the output, the speech or text information specified by the determined dialogue act.

2. The system according to claim 1, wherein if second input data indicating that the first candidate character sequence is confirmed is received, the one or more processors are further configured to provide the first candidate character sequence to the dialogue module.

3. The system according to claim 1, wherein if second input data indicating that the first candidate character sequence is confirmed is received, the one or more processors are further configured to determine if the first candidate character sequence is verified.

4. The system according to claim 3, wherein the third input data is provided to the dialogue module responsive to determining that the first candidate character sequence is verified.

5. The system according to claim 4, wherein determining if the first candidate character sequence is verified comprises comparing the first candidate character sequence with a reference character sequence.

6. The system according to claim 1, wherein determining a dialogue act comprises:
determining, based on the third input data, a belief state that comprises information corresponding to one or more dialogue options comprising a slot and a corresponding slot value;
determining the dialogue act by inputting information relating to the belief state into a policy model.

7. The system according to claim 1, wherein the one or more processors are further configured to:
generate an input request for a character sequence, wherein the input request is outputted by way of the output;
wherein the first input data is received in response to the input request.

8. The system according to claim 1, wherein selecting a candidate character sequence comprises:
applying one or more criteria to the candidate character sequences;
if no candidate character sequences in the list meet the one or more criteria, generating a repeat request for the user to repeat the input character sequence, wherein the repeat request is outputted by way of the output.

9. A method comprising:
receiving, by way of an input, input speech data originating from a user;
outputting, by way of an output, output speech or text information;
providing first input data to a character sequence determination module to determine a character sequence from the first input data, wherein determining a character sequence comprises:
obtaining a first list of one or more candidates character sequences from the first input data, wherein the one or more candidate character sequences comprise a plurality of individual characters which are separate units in the sequence;
selecting a first candidate character sequence from the first list;
generating a first confirm request to confirm the selected first candidate character sequence, wherein the first confirm request is outputted by way of the output;
if second input data indicating that the first candidate character sequence is not confirmed is received, generating a repeat request for the user to repeat the input character sequence, wherein the repeat request is outputted by way of the output; responsive to receiving fourth input data, obtaining a second list of one or more candidate character sequences from the fourth input data; selecting a second candidate character sequence from the second list, and generating a second confirm request to confirm the selected second candidate if the second candidate character sequence is different from the first candidate character sequence, wherein the second confirm request is outputted by way of the output; and
if second input data indicating that the first candidate character sequence is confirmed is received:
providing third input data to a dialogue module,
determining, based on the third input data, a dialogue act that specifies speech or text information; and
outputting, by way of the output, the speech or text information specified by the determined dialogue act.

10. A non-transitory carrier medium comprising computer readable code configured to cause a computer to perform a method comprising:

receiving, by way of an input, input speech data originating from a user;

outputting, by way of an output, output speech or text information;

providing first input data to a character sequence determination module to determine a character sequence from the first input data, wherein determining a character sequence comprises:

obtaining a first list of one or more candidate character sequences from the first input data, wherein the one or more candidate character sequences comprise a plurality of individual characters which are separate units in the sequence;

selecting a first candidate character sequence from the first list;

generating a first confirm request to confirm the selected first candidate character sequence, wherein the first confirm request is outputted by way of the output;

if second input data indicating that the first candidate character sequence is not confirmed is received, generating a repeat request for the user to repeat the input character sequence, wherein the repeat request is outputted by way of the output; responsive to receiving fourth input data, obtaining a second list of one or more candidate character sequences from the fourth input data; selecting a second candidate character sequence from the second list, and generating a second confirm request to confirm the selected second candidate if the second candidate character sequence is different from the first candidate character sequence, wherein the second confirm request is outputted by way of the output; and if second input data indicating that the first candidate character sequence is confirmed is received:
providing third input data to a dialogue module
determining, based on the third input data, a dialogue act that specifies speech or text information; and
outputting, by way of the output, the speech or text information specified by the determined dialogue act.

11. The method according to claim 9, wherein if second input data indicating that the first candidate character sequence is confirmed is received, providing the first candidate character sequence to the dialogue module.

12. The method according to claim 9, wherein if second input data indicating that the first candidate character sequence is confirmed is received, determining if the first candidate character sequence is verified.

13. The method according to claim 12, wherein, responsive to determining that the first candidate character sequence is verified, providing the third input data to the dialogue module.

14. The method according to claim 13, wherein determining if the first candidate character sequence is verified comprises comparing the first candidate character sequence with a reference character sequence.

15. The method according to claim 9, wherein determining a dialogue act comprises:
determining, based on the third input data, a belief state that comprises information corresponding to one or more dialogue options comprising a slot and a corresponding slot value;
determining the dialogue act by inputting information relating to the belief state into a policy model.

16. The method according to claim 9, further comprising:
generating an input request for a character sequence, wherein the input request is outputted by way of the output;
wherein the first input data is received in response to the input request.

17. The method according to claim 9, wherein selecting a candidate character sequence comprises:
applying one or more criteria to the candidate character sequences;
if no candidate character sequences in the list meet the one or more criteria, generating a repeat request for the user to repeat the input character sequence, wherein the repeat request is outputted by way of the output.

* * * * *